United States Patent
Sakai et al.

(10) Patent No.: US 11,588,950 B2
(45) Date of Patent: Feb. 21, 2023

(54) PRINTING DEVICE AND INFORMATION PROCESSING DEVICE

(71) Applicant: FUNAI ELECTRIC CO., LTD., Osaka (JP)

(72) Inventors: Hiroki Sakai, Osaka (JP); Yoshihiko Imura, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/035,761

(22) Filed: Sep. 29, 2020

(65) Prior Publication Data

US 2021/0160390 A1 May 27, 2021

(30) Foreign Application Priority Data

Nov. 25, 2019 (JP) .............................. JP2019-212017

(51) Int. Cl.
*H04N 1/00* (2006.01)
*H04N 1/60* (2006.01)

(52) U.S. Cl.
CPC ....... *H04N 1/00663* (2013.01); *H04N 1/0044* (2013.01); *H04N 1/00251* (2013.01); *H04N 1/6097* (2013.01)

(58) Field of Classification Search
CPC ............ H04N 1/00238; H04N 1/00127; G06F 3/1208; B41J 3/40731
See application file for complete search history.

(56) References Cited

U.S. PATENT DOCUMENTS

| 6,067,996 | A | * | 5/2000 | Weber | .................... A45D 31/00 132/73 |
|---|---|---|---|---|---|
| 6,286,517 | B1 | * | 9/2001 | Weber | .................... A45D 29/00 132/73 |
| 10,682,866 | B2 | | 6/2020 | Irie | |
| 2005/0110877 | A1 | * | 5/2005 | Shirakawa | ......... H04N 1/40068 348/222.1 |
| 2005/0151818 | A1 | * | 7/2005 | Ozawa | ................ B41J 25/3088 347/104 |
| 2013/0038647 | A1 | * | 2/2013 | Hashimoto | .............. B41J 29/02 347/2 |
| 2013/0335467 | A1 | | 12/2013 | Gerber | |
| 2014/0132968 | A1 | | 5/2014 | Bitoh et al. | |

(Continued)

FOREIGN PATENT DOCUMENTS

| CN | 109123989 | 1/2019 |
|---|---|---|
| JP | 2002165632 | 6/2002 |

(Continued)

*Primary Examiner* — King Y Poon
*Assistant Examiner* — Michael L Burleson
(74) *Attorney, Agent, or Firm* — JCIPRNET

(57) ABSTRACT

Provided is a printing device that can accurately perform printing on a recording medium. The printing device includes: a frame member disposed to surround a nail tip; a printing unit configured to perform printing on the nail tip surrounded by the frame member; a communication part configured to acquire print information which is generated based on an image obtained by capturing the frame member and the nail tip and indicates a layout of printing to be applied to the nail tip in a printable region defined by the frame member; and a print control part configured to control the printing unit based on the acquired print information.

16 Claims, 19 Drawing Sheets

(56) References Cited

U.S. PATENT DOCUMENTS

| | | | |
|---|---|---|---|
| 2015/0103367 A1 | 4/2015 | Tsujita | |
| 2016/0247304 A1* | 8/2016 | Sakiyama | G06T 13/20 |
| 2017/0273433 A1* | 9/2017 | Hori | A45D 34/04 |
| 2018/0278762 A1* | 9/2018 | Kawatsu | H04N 1/00323 |
| 2018/0281458 A1 | 10/2018 | Johnson et al. | |
| 2018/0361736 A1* | 12/2018 | Irie | A45D 29/22 |
| 2019/0183227 A1* | 6/2019 | Kim | C09D 11/03 |

FOREIGN PATENT DOCUMENTS

| | | |
|---|---|---|
| JP | 2013226760 | 11/2013 |
| WO | 2004018217 | 3/2004 |
| WO | 2015132734 | 9/2015 |

* cited by examiner

PRINTING DEVICE AND INFORMATION PROCESSING DEVICE

CROSS REFERENCE TO RELATED APPLICATIONS

This application claims the priority benefit of Japanese Patent Application No. 2019-212017, filed on Nov. 25, 2019. The entirety of the above-mentioned patent application is hereby incorporated by reference herein and made a part of this specification.

BACKGROUND

Technical Field

The disclosure relates to a printing device for performing printing on a recording medium, and an information processing device which can communicate with the printing device.

Description of Related Art

For example, a printing device for printing a three-dimensional object such as a nail tip (a so-called artificial nail) is known (for example, see Patent Document 1 (Japanese Patent Application Laid-Open No. 2003-226760)). A conventional printing device includes a tray for placing a three-dimensional object thereon, and a print head for performing printing on the three-dimensional object on the tray. The print head ejects ink toward a surface of the three-dimensional object placed at a predetermined position on the tray while reciprocating in a predetermined direction with respect to the tray.

In the conventional printing device described above, in the case in which a user places the three-dimensional object at an arbitrary position on the tray, there is a concern that the printing device may not be able to recognize a layout of the three-dimensional object on the tray. For that reason, there is a problem that printing on the three-dimensional object with high accuracy is difficult.

SUMMARY

The disclosure provides a printing device and an information processing device in which printing on a recording medium can be performed with high accuracy.

According to one embodiment of the disclosure, the disclosure provides a printing device for performing printing on a recording medium and includes: a frame member disposed to surround the recording medium; a printing part that performs printing on the recording medium surrounded by the frame member; an acquisition part that acquires print information which is generated based on an image obtained by capturing the frame member and the recording medium and indicates a layout of printing to be applied to the recording medium in a printable region defined by the frame member; and a print control part that controls the print part based on the acquired print information.

According to another embodiment of the disclosure, the disclosure provides an information processing device which can communicate with a printing device for performing printing on a recording medium, and includes: an imaging part that captures an image including the recording medium and a frame member disposed to surround the recording medium; a generation part that generates print information indicating a layout of printing to be applied to the recording medium in a printable region defined by the frame member based on the image captured by the imaging part; and a transmission part that transmits the generated print information to the printing device.

DESCRIPTION OF THE EMBODIMENTS

Hereinafter, embodiments of the disclosure will be described in detail with reference to the drawings. Also, the embodiments described below all show comprehensive or specific examples. Numerical values, shapes, materials, constituent elements, layout positions and connected forms of the constituent elements, and the like shown in the following embodiments are examples, and are not intended to limit the disclosure. Further, among the constituent elements in the following embodiments, constituent elements not described in independent claims are described as arbitrary constituent elements.

First Embodiment

1-1. Outline of Printing System

Figure 1:
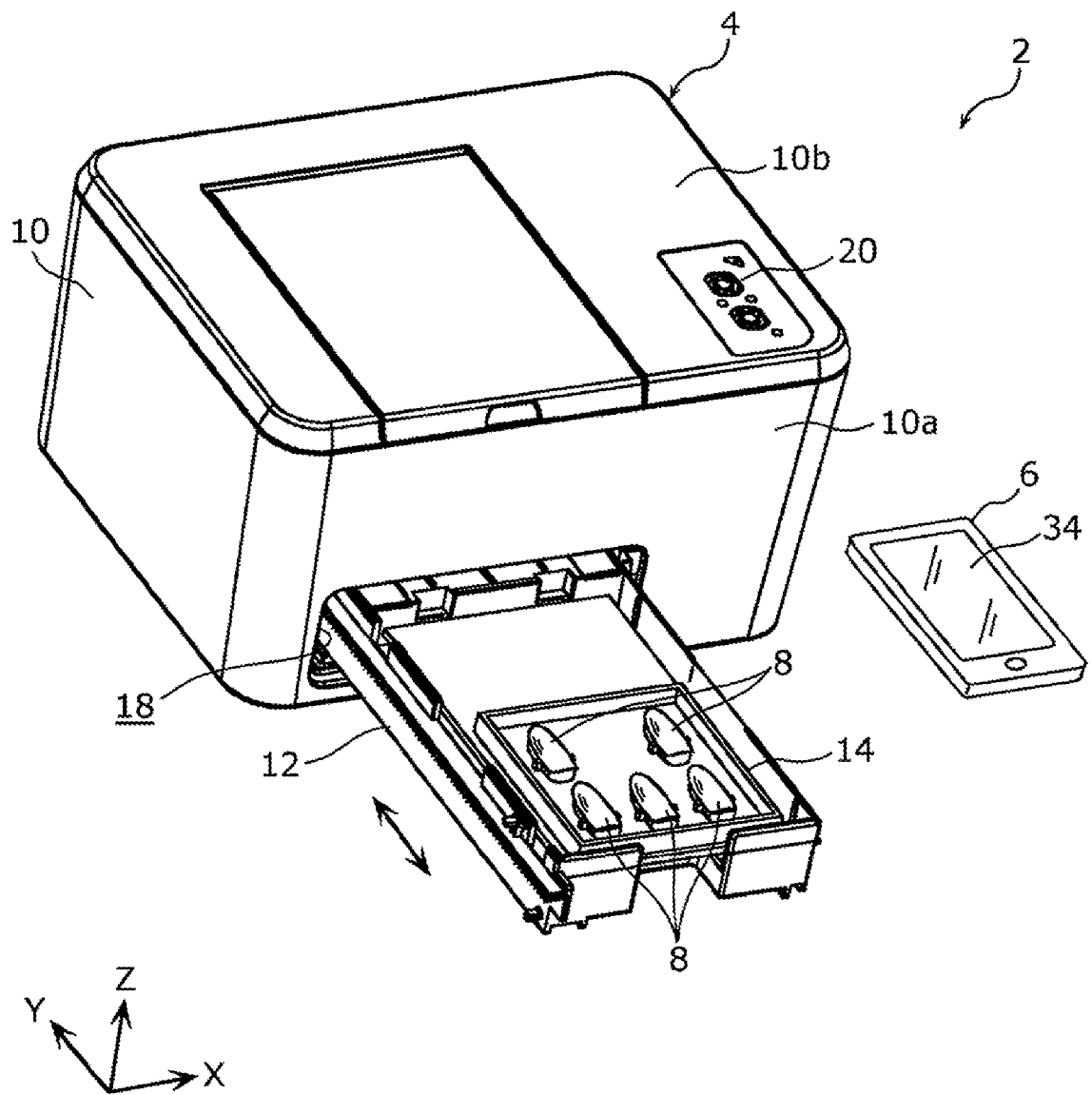
FIG. 1 is a perspective view showing a printing system according to a first embodiment.

First, an outline of a printing system 2 according to a first embodiment will be described with reference to FIG. 1. FIG. 1 is a perspective view showing a printing system 2 according to the first embodiment. Also, in FIG. 1 and the like, a width direction (a left to right direction) of a printing device 4 is defined as an X axis direction, a depth direction (a front to rear direction) of the printing device 4 is defined as a Y axis direction, and a height direction (a vertical direction) of the printing device 4 is defined as a Z axis direction.

As shown in FIG. 1, the printing system 2 includes the printing device 4 and a terminal device 6 (an example of an information processing device).

The printing device 4 is, for example, an inkjet printer for printing a design on a nail tip 8 (an example of a recording medium). Also, in the present specification, the design indicates a concept including, for example, a figure, a pattern, a shape, a color and the like.

The terminal device 6 is a mobile terminal such as a smartphone or a tablet terminal. The terminal device 6 can wirelessly communicate with the printing device 4 by Bluetooth (registered trademark) or the like, for example. A dedicated application for operating the printing device 4 is installed in the terminal device 6. A user can operate the printing device 4 by using the application installed in the terminal device 6 as a user interface.

1-2. Structure of Printing Device

Figure 2:
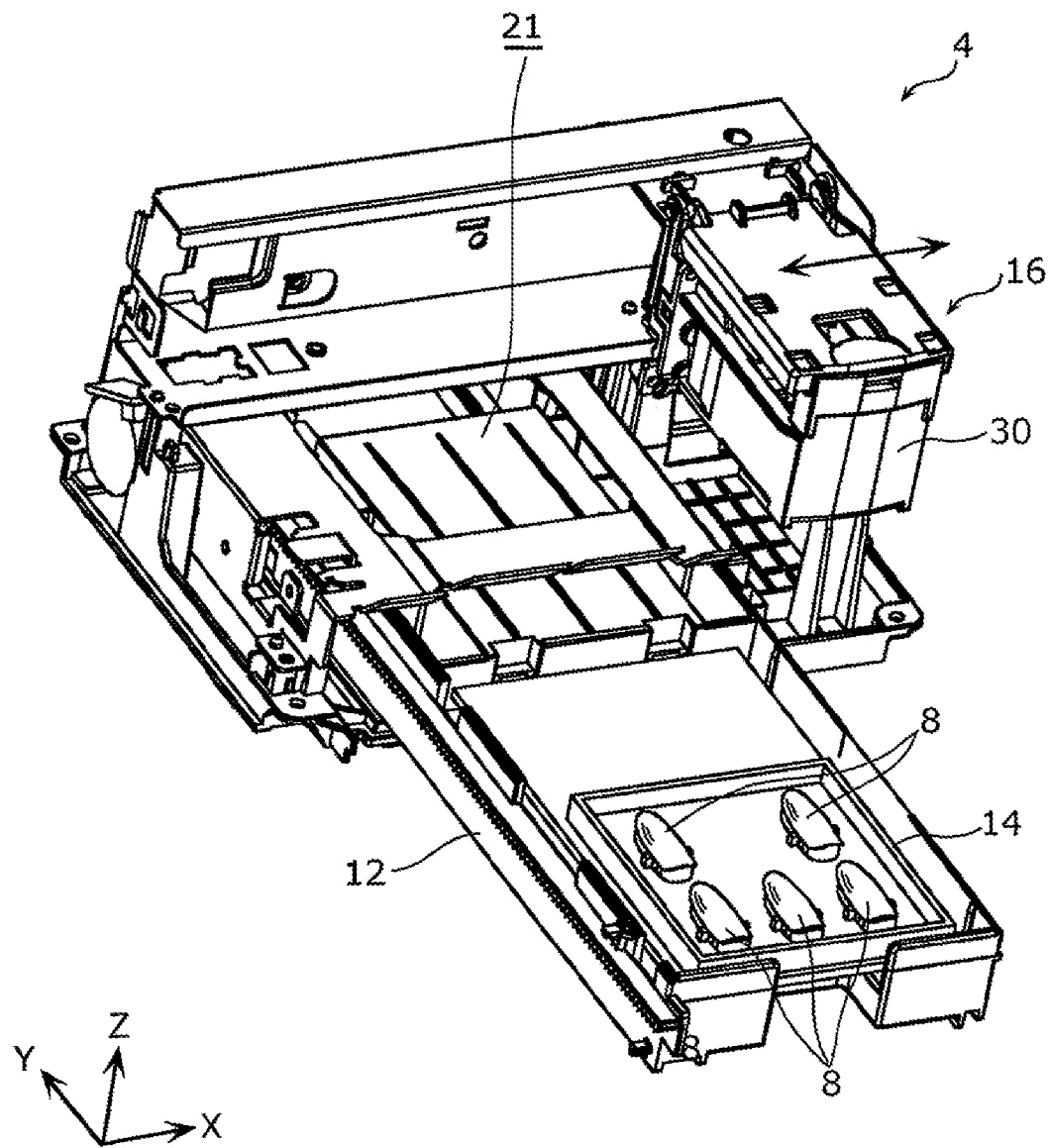
FIG. 2 is a perspective view showing an internal structure of the printing device according to the first embodiment.
Figure 3:
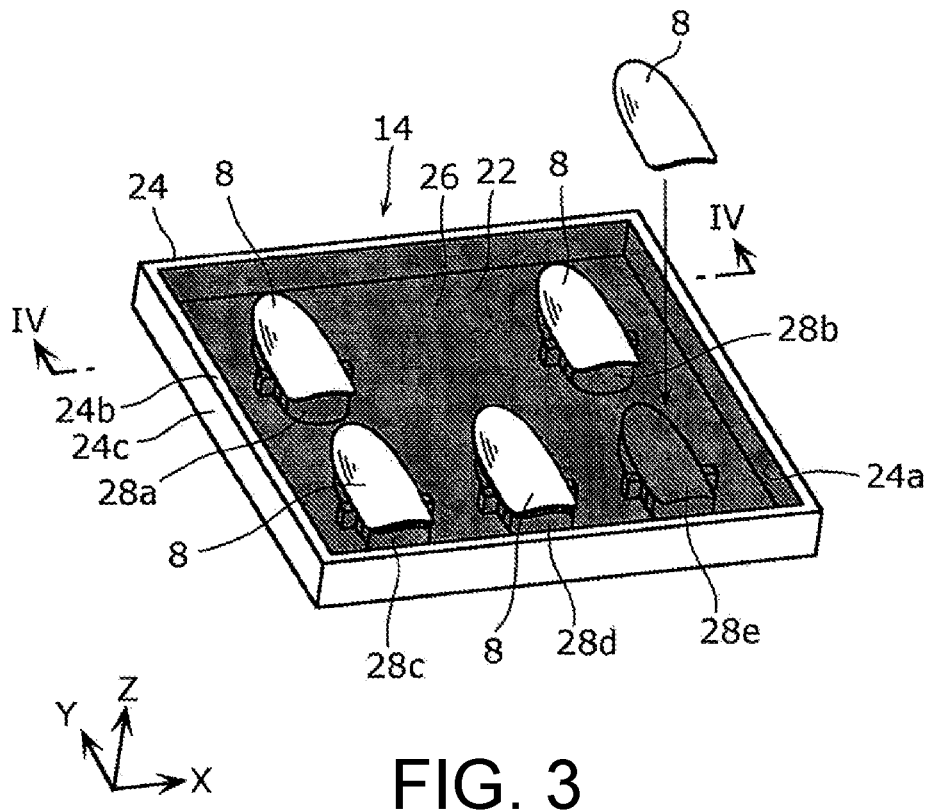
FIG. 3 is a perspective view showing an extracted state of a tray of the printing device according to the first embodiment.
Figure 4:
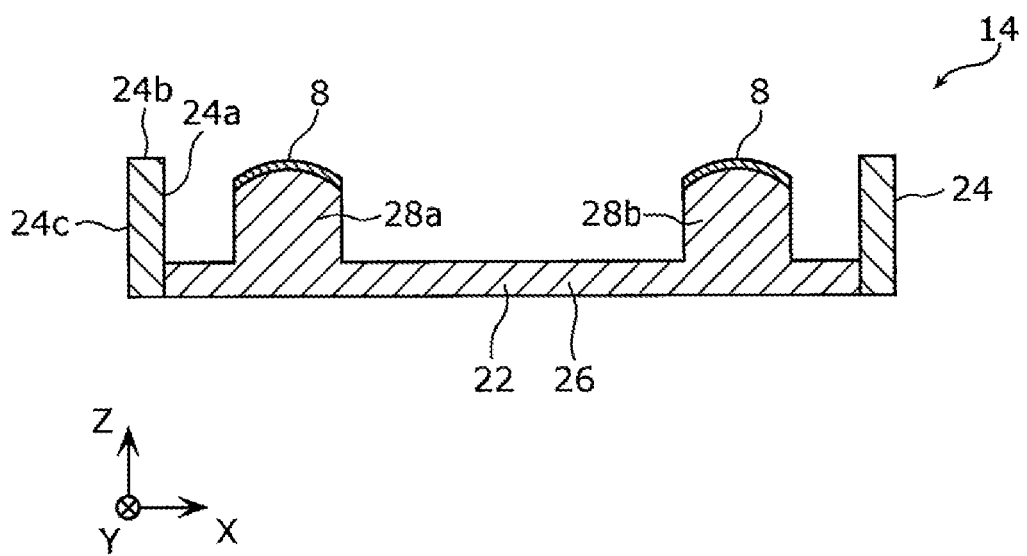
FIG. 4 is a cross-sectional view of the tray of the printing device according to the first embodiment along line IV-IV in FIG. 3.

Next, a structure of the printing device 4 according to the first embodiment will be described with reference to FIGS. 1 to 4. FIG. 2 is a perspective view showing an internal structure of the printing device 4 according to the first embodiment. FIG. 3 is a perspective view showing an extracted state of a tray 14 of the printing device 4 according to the first embodiment. FIG. 4 is a cross-sectional view of the tray 14 of the printing device 4 according to the first embodiment along line IV-IV in FIG. 3.

As shown in FIGS. 1 and 2, the printing device 4 includes a housing 10, a cassette 12, the tray 14, and a printing unit 16 (an example of a printing part).

As shown in FIG. 1, the housing 10 is formed in a box shape, for example. An opening 18 for inserting the cassette 12 is formed on a front surface 10a of the housing 10. A power button 20 for turning power of the printing device 4 on or off is disposed on a top surface 10b of the housing 10.

As shown in FIG. 1, the cassette 12 is for putting the tray 14 into and taking it out of the housing 10. The cassette 12 is slidable between a received position (not shown) at which it is received inside the housing 10 and a pulled-out position at which the housing 10 is pulled out toward a front side (a minus side of the Y axis) through the opening 18 (see FIG. 1).

As shown in FIG. 1, the tray 14 is for placing one or a plurality of nail tips 8 and is detachably supported on an upper surface of the cassette 12. With the cassette 12 in the received position, the tray 14 is disposed in a printing region 21 (see FIG. 2) inside the housing 10. As shown in FIGS. 3 and 4, the tray 14 has a placing member 22 and a frame member 24.

As shown in FIG. 3, the placing member 22 has a base 26 and a plurality of placing tables 28a, 28b, 28c, 28d, and 28e (28a to 28e). The base 26 is formed in a rectangular plate shape in an XY plan view. As shown in FIGS. 3 and 4, each of the plurality of placing tables 28a to 28e is formed to protrude upward (a plus side of the Z axis) from an upper surface (an example of a placing surface) of the base 26. The plurality of nail tips 8 to be printed are each placed on the plurality of placing tables 28a to 28e. Each upper surface (an example of the placing surface) of the plurality of placing tables 28a to 28e is formed in a convex shape corresponding to a shape of the nail tip 8. A height position of each upper end of the plurality of nail tips 8 placed on each of the plurality of placing tables 28a to 28e is the same height position as a height position of an end surface 24b of the frame member 24. The upper surface of the base 26 and each of the plurality of placing tables 28a to 28e are formed in black, for example. Also, for the convenience of explanation, expression of the black color of the placing member 22 is omitted in FIGS. 1 and 2, and the black color of the placing member 22 is replaced with a gray color in FIG. 3. In addition, in the present specification, the expression "formed in black (or white)" indicates a concept including all of a) a case of having been formed originally in black (or white), b) a case of being painted later in black (or white), and c) a case in which a black (or white) label or sheet is attached.

As shown in FIG. 3, the frame member 24 is formed in a rectangular tubular shape in an XY plan view and is disposed along an outer peripheral part of the upper surface of the base 26 of the placing member 22. Specifically, as shown in FIG. 4, the frame member 24 is disposed to rise from the outer peripheral part of the upper surface of the base 26 of the placing member 22 and is disposed to surround one or a plurality of nail tips 8 mounted on the placing member 22. Also, in the present specification, "disposed to surround one or a plurality of nail tips 8" does not indicate only a case in which the entire circumference of one or a plurality of nail tips 8 is surrounded, but also indicates a case in which only a part of the entire circumference of one or a plurality of nail tips 8 is surrounded. An inner peripheral surface 24a of the frame member 24 is formed in the same color as the placing member 22, that is, in black. Also, in the present specification, "the same color" indicates a concept including not only exactly the same color but also similar colors. Further, the end surface 24b and an outer peripheral surface 24c of the frame member 24 in an axial direction (the Z axis direction) have a color different from the color of the placing member 22, for example, in white. Also, for the convenience of explanation, expression of the black color of the inner peripheral surface 24a of the frame member 24 is omitted in FIGS. 1 and 2, and the black color of the inner peripheral surface 24a of the frame member 24 is replaced with a gray color in FIG. 3.

As shown in FIG. 2, the printing unit 16 is a part for printing the design on the nail tip 8 and is disposed inside the housing 10. A printing method of the printing unit 16 is an inkjet method in which printing is performed by spraying mist-like ink on the nail tip 8. The printing unit 16 has a carriage 30, a first drive mechanism (not shown), and a second drive mechanism (not shown).

An ink tank (not shown) and a print head (not shown) are mounted in the carriage 30. The ink tank is filled with four types of ink, for example, CMYK (C: cyan, M: magenta, Y: yellow, K: black). The print head discharges each color of ink from the ink tank downward (toward a minus side of the Z axis).

The first drive mechanism is a mechanism for moving the carriage 30 in the left to right direction (X axis direction). The second drive mechanism is a mechanism for moving the tray 14 in the front to rear direction (Y axis direction) in the printing region 21.

When printing is performed, the first drive mechanism reciprocates the carriage 30 in the left to right direction, and the second drive mechanism moves the tray 14 in the printing region 21 from one side in the front to rear direction to the other side (from a plus side of the Y axis to the minus side). In this state, the ink from the print head mounted on the carriage 30 is sprayed toward the tray 14 disposed in the printing region 21, and thus printing is applied to one or a plurality of nail tips 8 placed on the tray 14.

1-3. Functional Configuration of Printing System

Figure 5:
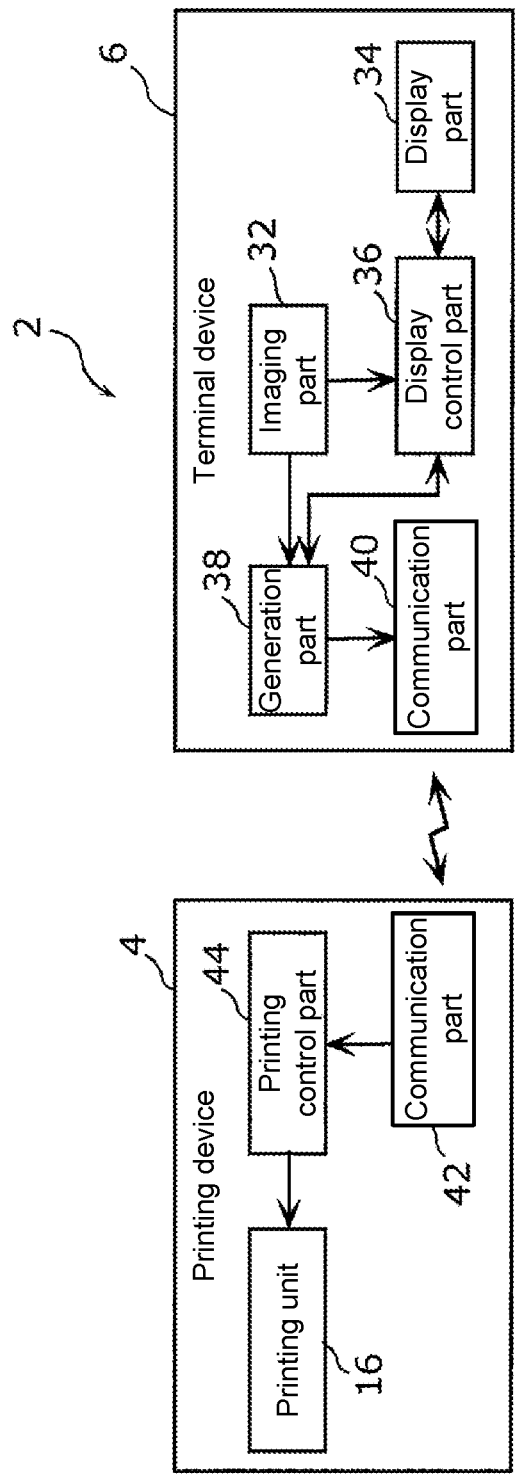
FIG. 5 is a block diagram showing a functional configuration of the printing system according to the first embodiment.

Next, a functional configuration of the printing system 2 according to the first embodiment will be described with reference to FIG. 5. FIG. 5 is a block diagram showing the functional configuration of the printing system 2 according to the first embodiment.

As illustrated in FIG. 5, the terminal device 6 includes an imaging part 32, a display part 34, a display control part 36, a generation part 38, and a communication part 40 (an example of a transmission part).

The imaging part 32 is a camera for capturing an image in front of the terminal device 6 as a subject. The imaging part 32 is, for example, a camera that uses a complementary metal oxide semiconductor (CMOS) image sensor or a charge coupled device (CCD) image sensor. The imaging part 32 outputs the captured image to each of the display control part 36 and the generation part 38.

The display part 34 is, for example, a liquid crystal panel, and displays various screens. Also, the display part 34 is also a touch panel that serves as a user interface that receives various instructions from the user.

The display control part 36 controls display content of the display part 34. Specifically, the display control part 36 causes the display part 34 to display the image being captured by the imaging part 32 in real time. In addition, the display control part 36 causes the display part 34 to display a layout image (which will be described later) showing a layout of one or more nail tips 8 in a printable region defined by the frame member 24 based on layout information (which will be described later) when the generation part 38 generates the layout information. Other functions of the display control part 36 will be described later.

The generation part 38 generates operation information indicating various user instructions received by the display part 34 that functions as a touch panel. Further, the generation part 38 generates print information indicating a layout of printing to be applied to one or a plurality of nail tips 8 in the printable region defined by the frame member 24 based on the image captured by the imaging part 32. The generation part 38 outputs the generated operation information and print information to the communication part 40.

The communication part 40 wirelessly communicates with a communication part 42 of the printing device 4. The communication part 40 transmits, for example, the operation information and the print information generated by the generation part 38 to the communication part 42 of the printing device 4.

As shown in FIG. 5, the printing device 4 includes the communication part 42 (an example of an acquisition part), a print control part 44, and the printing unit 16. Also, since the printing unit 16 has already been described, the description thereof will be omitted here.

The communication part 42 wirelessly communicates with the communication part 40 of the terminal device 6. The communication part 42 receives (acquires) the operation information and the print information transmitted from the communication part 40 of the terminal device 6, for example. The communication part 42 outputs the received operation information and print information to the print control part 44.

The print control part 44 controls the printing unit 16 based on the operation information and the print information from the communication part 42. Specifically, based on the operation information and the print information from the communication part 42, the print control part 44 controls an ink discharge timing from the print head mounted on the carriage 30 and controls driving of each of the first drive mechanism and the second drive mechanism.

1-4. Printing Procedure in Printing System

Next, a function of the display control part 36 of the terminal device 6 will be described while a printing procedure in the printing system 2 according to the first embodiment is described with reference to FIGS. 6 to 11.

Figure 6:
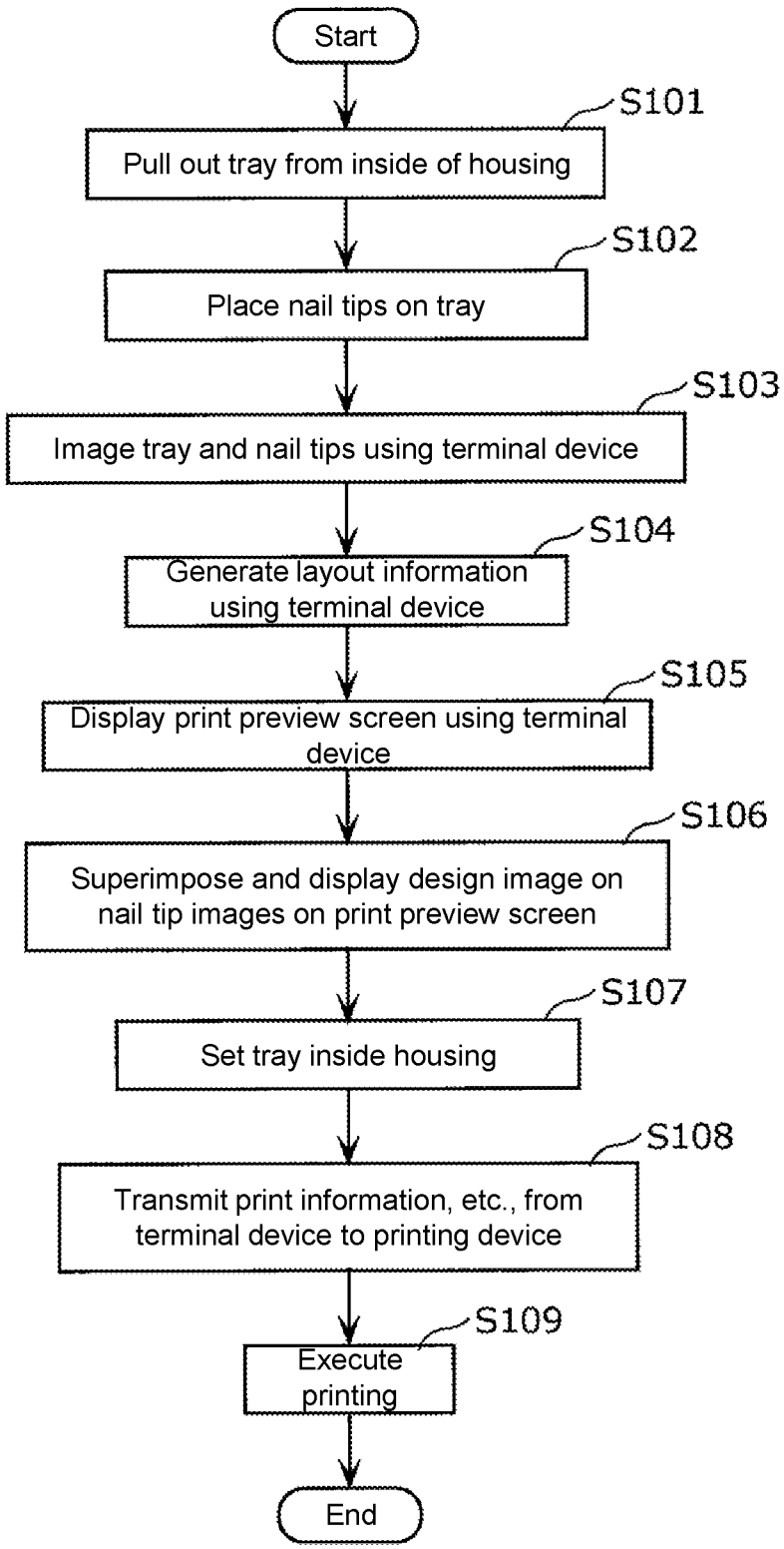
FIG. 6 is a flowchart showing a flow of a printing procedure in the printing system according to the first embodiment.
Figure 7:
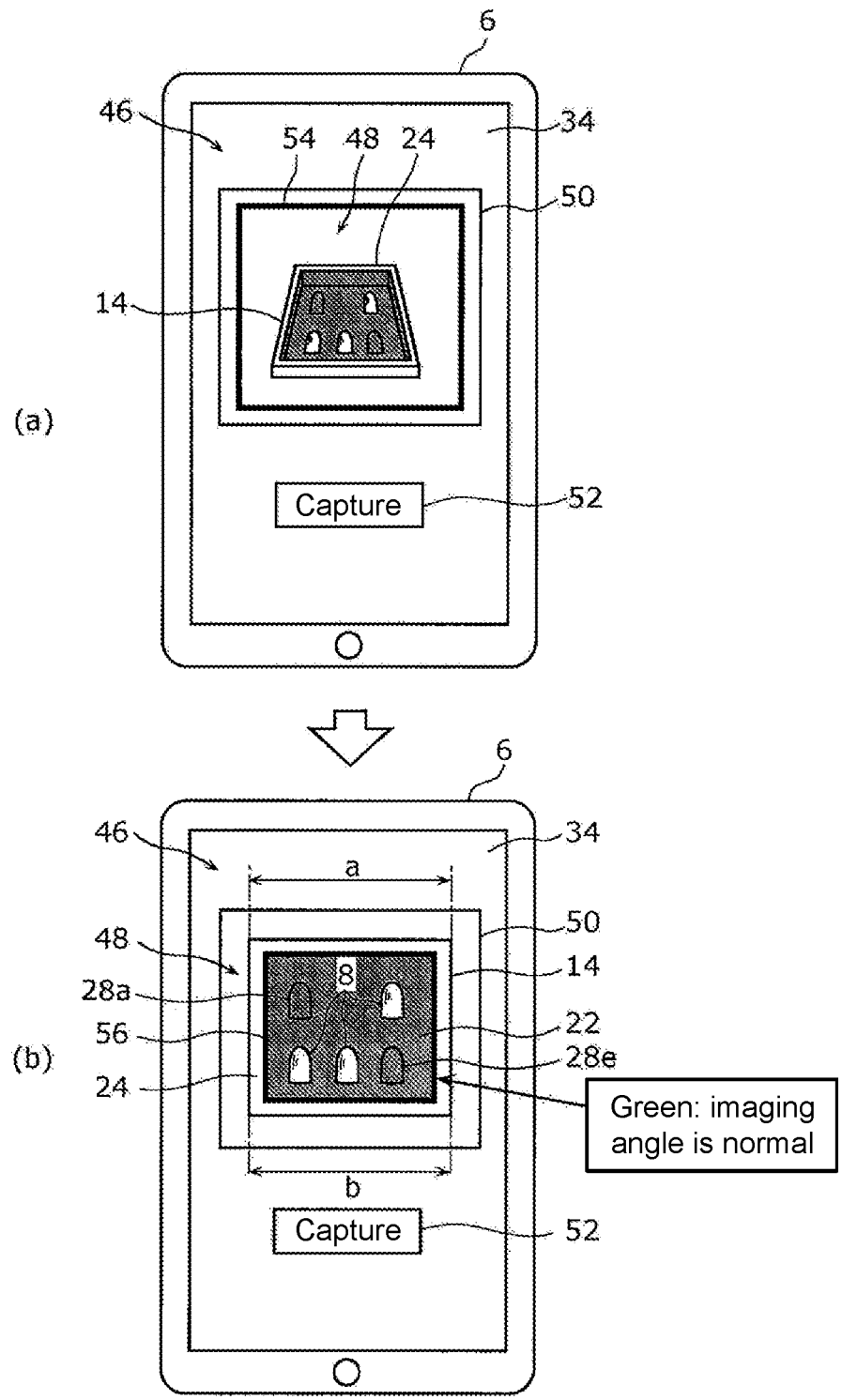
FIG. 7 is a diagram showing an example of a camera screen displayed on a terminal device according to the first embodiment in a case in which an imaging angle by an imaging part is normal.
Figure 8A:
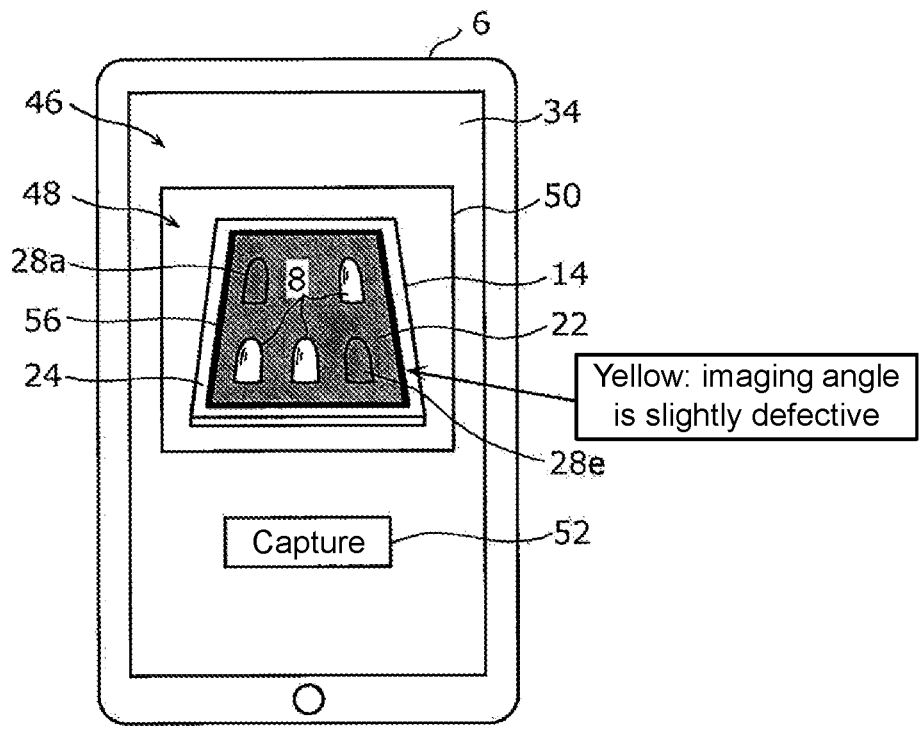
FIG. 8A is a diagram showing an example of the camera screen displayed on the terminal device according to the first embodiment in a case in which the imaging angle by the imaging part is slightly defective.
Figure 8B:
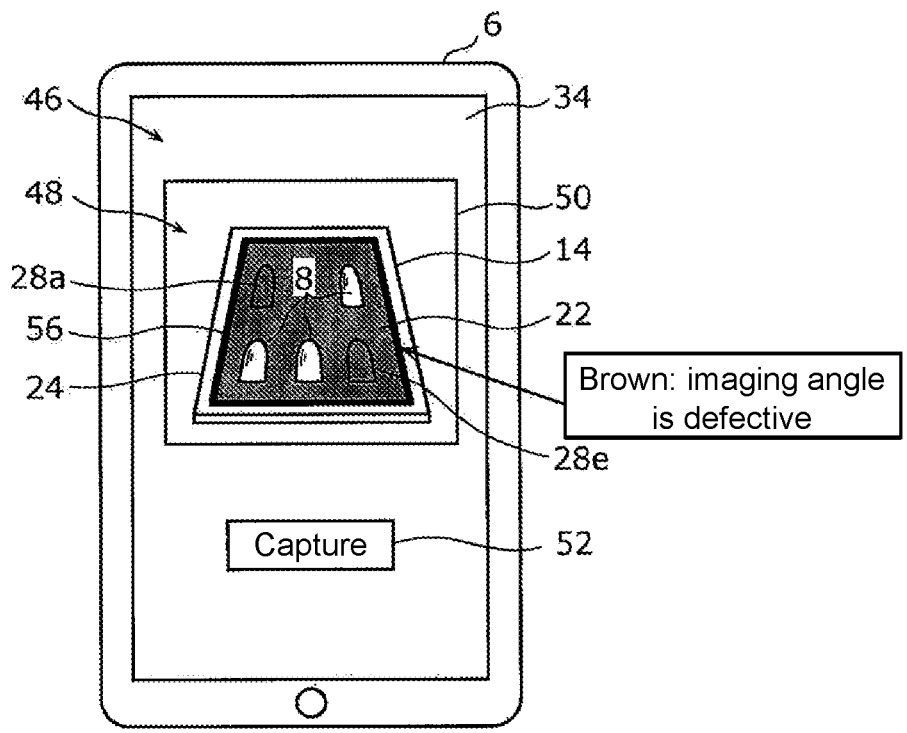
FIG. 8B is a diagram showing an example of the camera screen displayed on the terminal device according to the first embodiment in a case in which the imaging angle by the imaging part is defective.
Figure 8C:
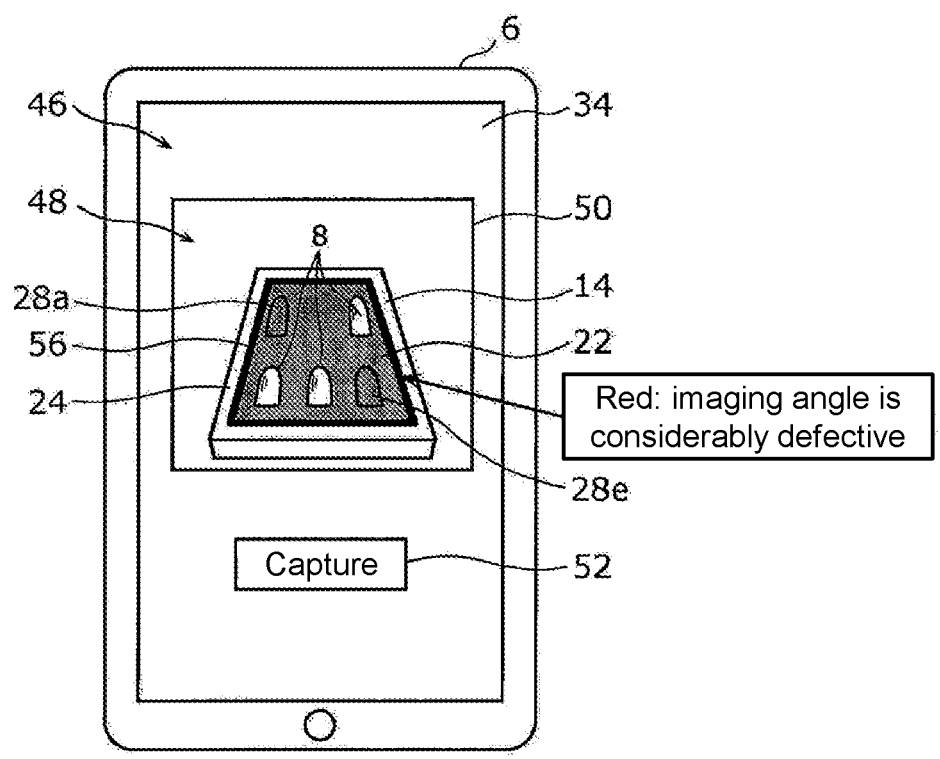
FIG. 8C is a diagram showing an example of the camera screen displayed on the terminal device according to the first embodiment in a case in which the imaging angle by the imaging part is considerably defective.

FIG. 6 is a flowchart showing a flow of the printing procedure in the printing system 2 according to the first embodiment. FIG. 7 is a diagram showing an example of a camera screen 46 displayed on the terminal device 6 according to the first embodiment when an imaging angle of the imaging part 32 is normal. FIG. 8A is a diagram showing an example of the camera screen 46 displayed on the terminal device 6 according to the first embodiment when the imaging angle of the imaging part 32 is slightly defective. FIG. 8B is a diagram showing an example of the camera screen 46 displayed on the terminal device 6 according to the first embodiment when the imaging angle of the imaging part 32 is defective. FIG. 8C is a diagram showing an example of the camera screen 46 displayed on the terminal device 6 according to the first embodiment when the imaging angle of the imaging part 32 is considerably defective.

Figure 9A:
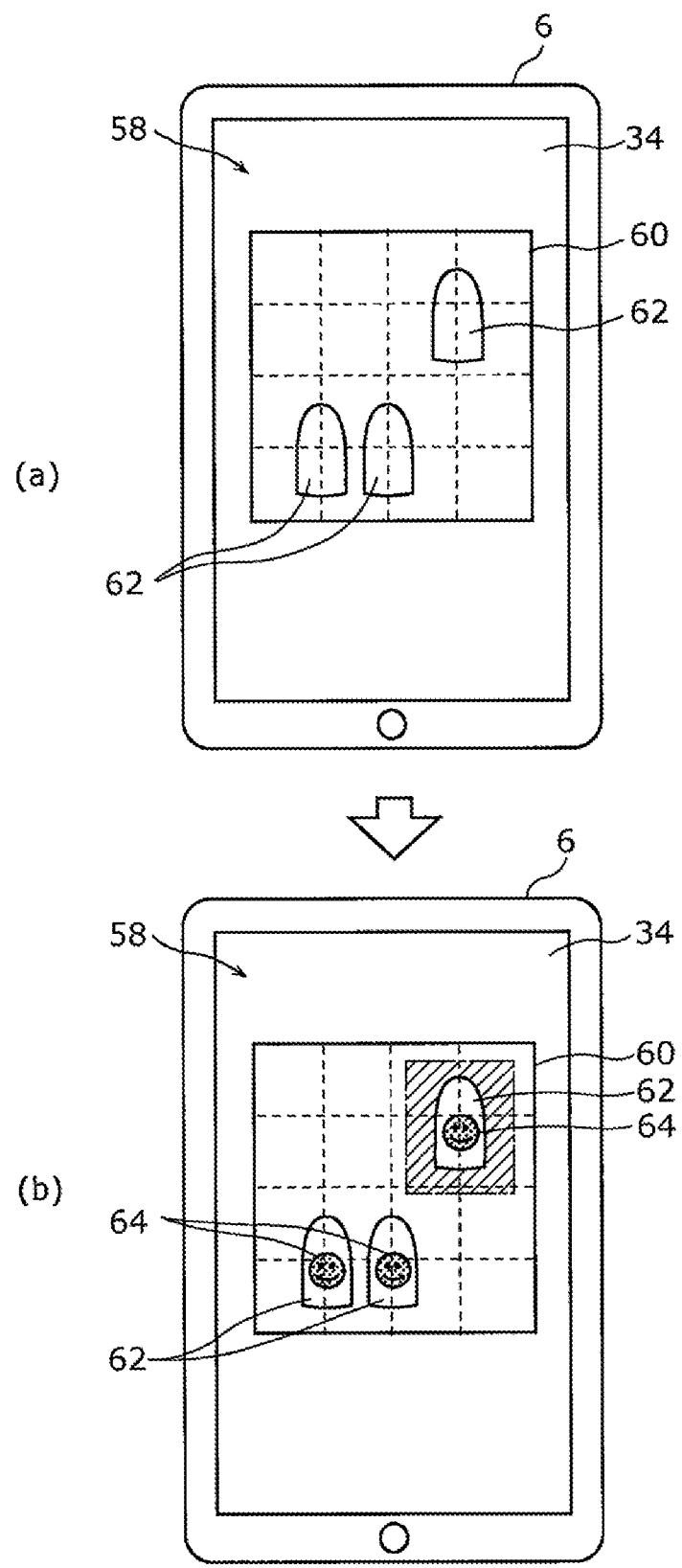
FIG. 9A is a diagram showing an example of a print preview screen displayed on the terminal device according to the first embodiment.
Figure 9B:
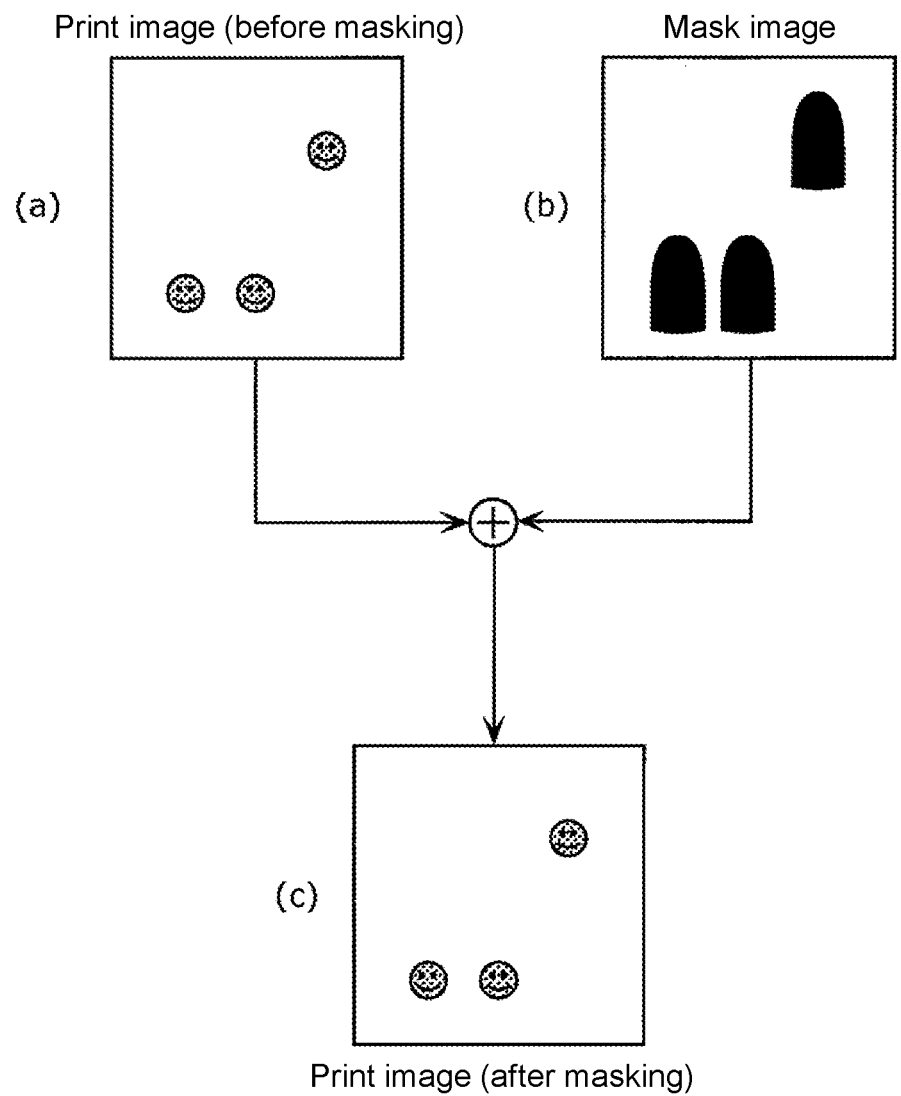
FIG. 9B is a conceptual diagram for explaining a process of a generation part of the terminal device according to the first embodiment.
Figure 10:
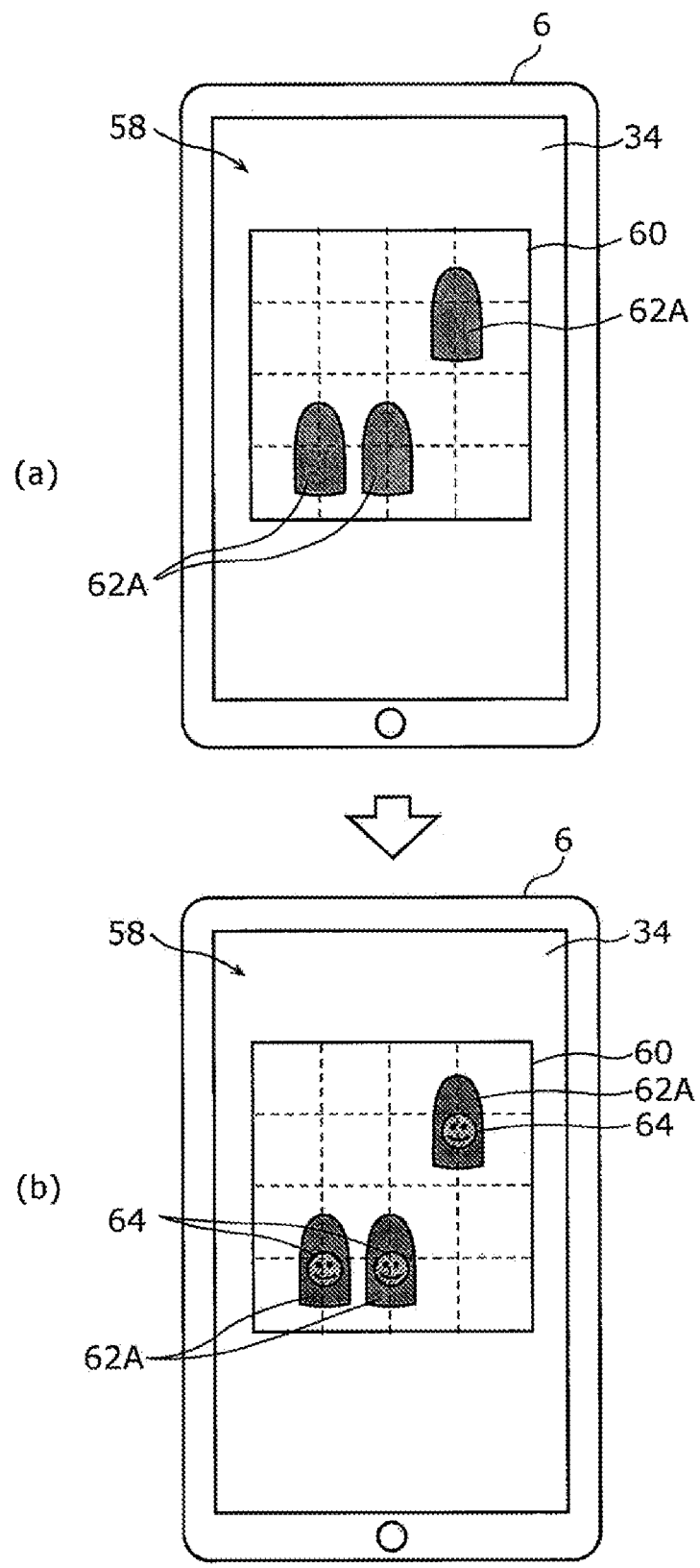
FIG. 10 is a diagram showing another example of the print preview screen displayed on the terminal device according to the first embodiment.
Figure 11:
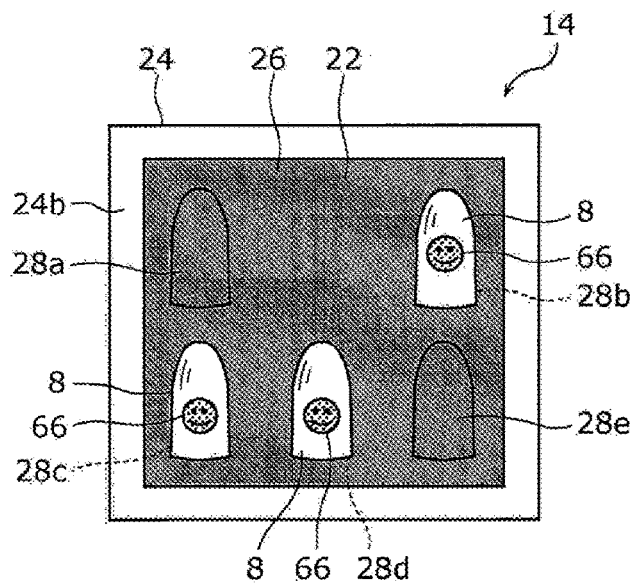
FIG. 11 is a diagram for explaining an example of a print result in the printing system according to the first embodiment.

FIG. 9A is a diagram showing an example of a print preview screen 58 displayed on the terminal device 6 according to the first embodiment. FIG. 9B is a conceptual diagram for explaining a process of the generation part 38 of the terminal device 6 according to the first embodiment. FIG. 10 is a diagram showing another example of the print preview screen 58 displayed on the terminal device 6 according to the first embodiment. FIG. 11 is a diagram for explaining an example of a print result in the printing system 2 according to the first embodiment.

As shown in FIG. 6, first, the user slides the cassette 12 of the printing device 4 from the received position to the pulled-out position, and then removes the tray 14 from the cassette 12 to thereby take out the tray 14 from the inside of the housing 10 (S101). Next, the user places one or a plurality of nail tips 8 to be printed on any of the plurality of placing tables 28a to 28e of the tray 14 (S102). Here, a case in which the user places three nail tips 8 on, for example, three placing tables 28b to 28d among the plurality of placing tables 28a to 28e of the tray 14 will be described. Also, surfaces of the nail tips 8 placed on the tray 14 are configured to have white colors in advance.

Then, for example, while the tray 14 is placed on a table or the like, the user captures an image of the tray 14 and the three nail tips 8 placed on the tray 14 from above using the imaging part 32 of the terminal device 6 (S103). At this time, as shown in (a) of FIG. 7, the display control part 36 of the terminal device 6 causes the display part 34 to display the camera screen 46. The camera screen 46 includes a camera window 50 for displaying the image 48 being captured by the imaging part 32 in real time, and a capture button 52 for capturing the image 48 currently displayed on the camera window 50 as a still image.

As shown in (a) of FIG. 7, the display control part 36 causes the camera window 50 to display a guide frame line 54. The guide frame line 54 is a frame line for guiding the user such that the frame member 24 included in the image 48 is displayed in the entire outer frame of the camera window 50. The guide frame line 54 is, for example, a rectangular red frame line and is displayed along the outer frame of the camera window 50. As shown in (b) of FIG. 7, when the frame member 24 included in the image 48 is displayed in the entire outer frame of the camera window 50, the display control part 36 switches the guide frame line 54 from display to non-display.

Further, as shown in (b) of FIG. 7, when the guide frame line 54 is switched from display to non-display, the display control part 36 causes the camera window 50 to display a notification frame line 56 (an example of a notification display). The notification frame line 56 is a frame line for notifying the user whether the imaging angle of the imaging part 32 of the terminal device 6 is normal or not. The notification frame line 56 is, for example, a rectangular frame line and is displayed to be superimposed on the frame member 24 included in the image 48.

At this time, the display control part 36 changes a color of the notification frame line 56 in accordance with the imaging angle of the imaging part 32 of the terminal device 6. Specifically, as shown in (b) of FIG. 7, the display control part 36 determines whether the imaging angle of the imaging part 32 of the terminal device 6 is normal or not, for example, based on an absolute value (|a−b|) of a difference between a length a of an upper side and a length b of a lower side of the frame member 24 included in the image 48.

As shown in (b) of FIG. 7, in the case in which the imaging part 32 of the terminal device 6 is capturing an image from directly above the tray 14, the absolute value (|a−b|) of the difference is equal to or more than 0 and less than a first threshold, and thus the display control part 36 determines that the imaging angle of the imaging part 32 of the terminal device 6 is normal. In this case, the display control part 36 sets the color of the notification frame line 56 to be green, which indicates that the imaging angle of the imaging part 32 of the terminal device 6 is normal.

Also, as shown in FIG. 8A, in the case in which the imaging part 32 of the terminal device 6 is capturing an image slightly obliquely above the tray 14, the absolute value (|a−b|) of the difference is equal to or more than the first threshold and less than a second threshold, and thus the display control part 36 determines that the imaging angle of the imaging part 32 of the terminal device 6 is slightly defective. In this case, the display control part 36 sets the color of the notification frame line 56 to be yellow, which indicates that the imaging angle of the imaging part 32 is slightly defective.

Also, as shown in FIG. 8B, in the case in which the imaging part 32 of the terminal device 6 is capturing an image obliquely from above the tray 14, the absolute value (|a−b|) of the difference is equal to or greater than the second threshold and less than a third threshold, and thus the display control part 36 determines that the imaging angle of the imaging part 32 of the terminal device 6 is defective. In this case, the display control part 36 sets the color of the notification frame line 56 to be brown, which indicates that the imaging angle of the imaging part 32 is defective.

Also, as shown in FIG. 8C, in the case in which the imaging part 32 of the terminal device 6 is capturing an image further obliquely above the tray 14, the absolute value (|a−b|) of the difference is equal to or greater than the third threshold value and less than a fourth threshold, and thus the display control part 36 determines that the imaging angle of the imaging part 32 of the terminal device 6 is considerably defective. In this case, the display control part 36 sets the color of the notification frame line 56 to be red, which indicates that the imaging angle of the imaging part 32 is considerably defective.

Therefore, in the case in which the color of the notification frame line 56 is any one of yellow, brown, and red, the user can recognize that the imaging angle of the imaging part 32 of the terminal device 6 is not normal and can appropriately adjust the imaging angle of the imaging part 32 of the terminal device 6 so that the color of the notification frame line 56 changes to be green.

Further, although the notification frame line 56 has been described as a rectangular frame line in the present embodiment, it is not limited thereto, and may be, for example, a) four marks such as circles, which are respectively superimposed on four corners of the frame member 24 included in the image 48, b) a straight line connecting any four points on the frame member 24 included in the image 48 to each other, c) a specific color (for example, translucent white) having a specific transparency displayed in a region outside the frame member 24 included in the image 48, etc.

As shown in (b) of FIG. 7, the user operates (taps) the capture button 52 in the state in which the color of the notification frame line 56 is green, whereby the display control part 36 captures the image 48 currently displayed in the camera window 50 as a still image. The display control part 36 outputs the captured image 48 to the generation part 38. Also, although the image 48 has been captured as a still image in the present embodiment, it is not limited thereto, and for example, the image 48 may be captured as a video, and an optimum still image may be selected from the captured video.

The generation part 38 generates the layout information indicating the layout of the three nail tips 8 in the printable region defined by the frame member 24 included in the image 48 (S104) by executing, for example, perspective conversion processing on the image 48 from the display control part 36. At this time, the generation part 38 recognizes the printable region based on a contrast between the end surface 24*b* of the frame member 24 included in the image 48 and the placing member 22 included in the image 48. Further, the generation part 38 recognizes the layout of the three nail tips 8 in the printable region based on a contrast between the three nail tips 8 included in the image 48 and the placing member 22 included in the image 48. The generation part 38 outputs the generated layout information to the display control part 36 and the communication part 40. The display control part 36 causes the display part 34 to display the print preview screen 58 based on the layout information from the generation part 38 (S105).

Also, the placing member 22 is formed in black, and thus even when the ink discharged from the ink head adheres to the placing member 22, ink stains on the placing member 22 are hardly noticeable and hardly affect the contrast described above.

As shown in (a) of FIG. 9A, the print preview screen 58 includes a layout image 60 showing the layout of one or more nail tips 8 in the printable region defined by the frame member 24. An outer frame of the layout image 60 indicates a range of the printable region defined by the inner peripheral surface of the frame member 24. The layout image 60 includes nail tip images 62 (an example of a recording medium image) showing the nail tips 8. In the example shown in (a) of FIG. 9A, the layout image 60 shows the layout in which three nail tips 8 are placed on the placing tables 28*b* to 28*d* in the printable region.

Then, as shown in (b) of FIG. 9A, the user operates the terminal device 6 such that a type of the design to be printed on the nail tips 8 is selected and a design image 64 showing the selected design is dragged and superimposed on the nail tip images 62 on the print preview screen 58. As a result, the display control part 36 causes the design image 64 in the layout image 60 to be superimposed and displayed on the nail tip images 62 (S106). At this time, the display control part 36 displays the nail tip images 62 in original colors (colors before printing) of the nail tips 8 in the layout image 60 and displays the design image 64 in an actual print color of the design. For example, the display control part 36 displays the nail tip images 62 in white and the design image 64 in yellow.

At this time, when the design image 64 is superimposed and displayed on the nail tip images 62 in the layout image 60, the display control part 36 performs a masking process of masking a region of the design image 64 projecting outside the nail tip image 62. That is, as shown in (b) of FIG. 9A, in the case in which an original size of the design image 64 (shown by dashed frame lines in (b) of FIG. 9A) is larger than a size of the nail tip image 62, the display control part 36 masks the region (shown by diagonal lines in (b) of FIG. 9A) projecting outside a contour of the nail tip image 62 in the design image 64 through the masking process. As a result, wasteful discharge of ink from the ink head toward the region outside the nail tip 8 (such as the upper surface of the base 26) can be inhibited during printing, and wasteful consumption of ink can be inhibited. Further, it is possible to prevent the tray 14 from being unnecessarily soiled due to the ink from the ink head adhering to the tray 14.

The generation part 38 generates print information indicating a layout of printing to be applied to the nail tips 8 based on the design image 64 superimposed on the nail tip images 62 and outputs the generated print information to the communication part 40.

Specifically, the generation part 38 generates a print image shown in (a) of FIG. 9B based on the design image 64 superimposed on the nail tip images 62. In addition, the generation part 38 generates a mask image having contours of the nail tips 8 disposed in the printable region as shown in (b) of FIG. 9B by binarizing the image 48 and detecting the layout of the nail tips 8. Further, the generation part 38 performs the masking process (that is, masking the region outside the mask image in the design image 64 described above) on the print image shown in (a) of FIG. 9B with the mask image shown in (b) of FIG. 9B, thereby generating the print image as shown in (c) of FIG. 9B as the print information. That is, the print information is information indicating how to dispose one or a plurality of design images 64 in the printable region.

Also, in the case in which the original color of the nail tip 8 is, for example, blue and a yellow design is printed on the blue nail tip 8, the yellow ink of the printed design is mixed with the blue color of the nail tip 8 and becomes green. At this time, if a color (for example, green) of the design actually printed on the nail tip 8 is different from a color (for example, yellow) of the design image 64 displayed on the print preview screen 58, the user may feel uneasy. Therefore, as shown in (a) and (b) of FIG. 10, when the original color of the nail tip 8 is a color other than white (for example, blue), the display control part 36 synthesizes pixels using a subtractive color method in the design image 64 (for example, yellow) superimposed on a nail tip image 62A (for example, blue) in the layout image 60. As a result, since the color of the design image 64 becomes the same color as the color of the design actually printed on the nail tip 8 (for example, green), it is possible to prevent the user from feeling uneasy.

Then, the user attaches the tray 14 to the upper surface of the cassette 12 and slides the cassette 12 from the pulled-out position to the received position to set the tray 14 inside the housing 10 (S107). Then, the user operates the terminal device 6 to instruct execution of printing, and thus the communication part 40 of the terminal device 6 transmits the operation information and the print information to the communication part 42 of the printing device 4 (S108).

The print control part 44 recognizes the layout of the three nail tips 8 in the printable region and the design to be printed on each nail tip 8 based on the operation information and the print information from the communication part 42 and controls the printing unit 16. As a result, as shown in FIG. 11, the printing unit 16 prints the design 66 corresponding to the design image 64 on the three nail tips 8 placed on the placing tables 28*b* to 28*d* (S109).

1-5. Effects

As described above, the generation part 38 of the terminal device 6 generates the print information indicating the layout of printing to be applied to the nail tips 8 in the printable region defined by the frame member 24 based on the image 48 including the nail tips 8 and the frame member 24 disposed to surround the nail tips 8. The print control part 44 of the printing device 4 acquires the print information from the terminal device 6 and controls the printing unit 16 based on the acquired print information.

Thus, even in the case in which the user places the nail tips 8 on any placing table of the plurality of placing tables 28*a* to 28*e* of the tray 14, the print control part 44 of the printing device can recognize the layout of printing to be applied to the nail tips 8 placed on the tray 14. As a result, in the printing device 4, it is possible to perform printing on the nail tip 8 placed on an arbitrary placing table with high accuracy.

Figure 12:
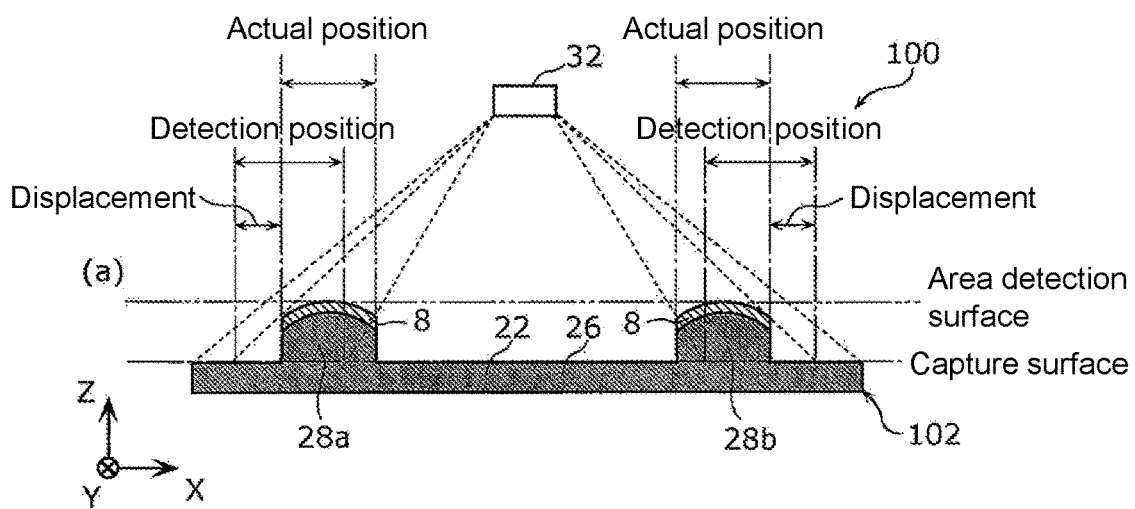
FIG. 12 is a diagram for explaining printing in a printing system according to a comparative example.
Figure 12:
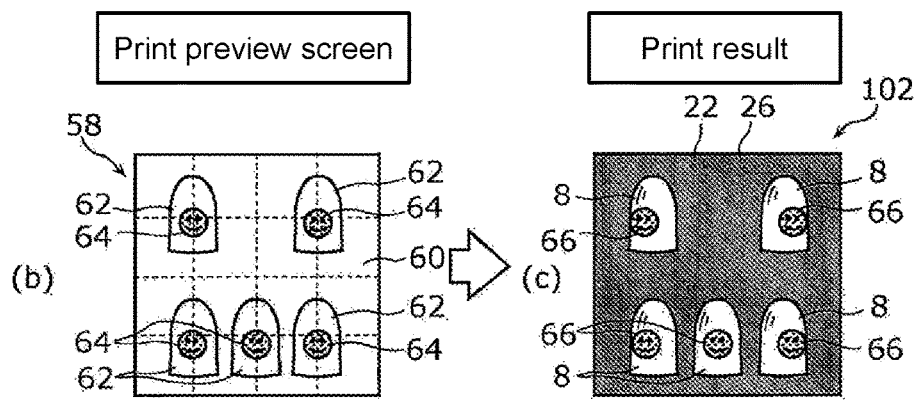
Figure 13:
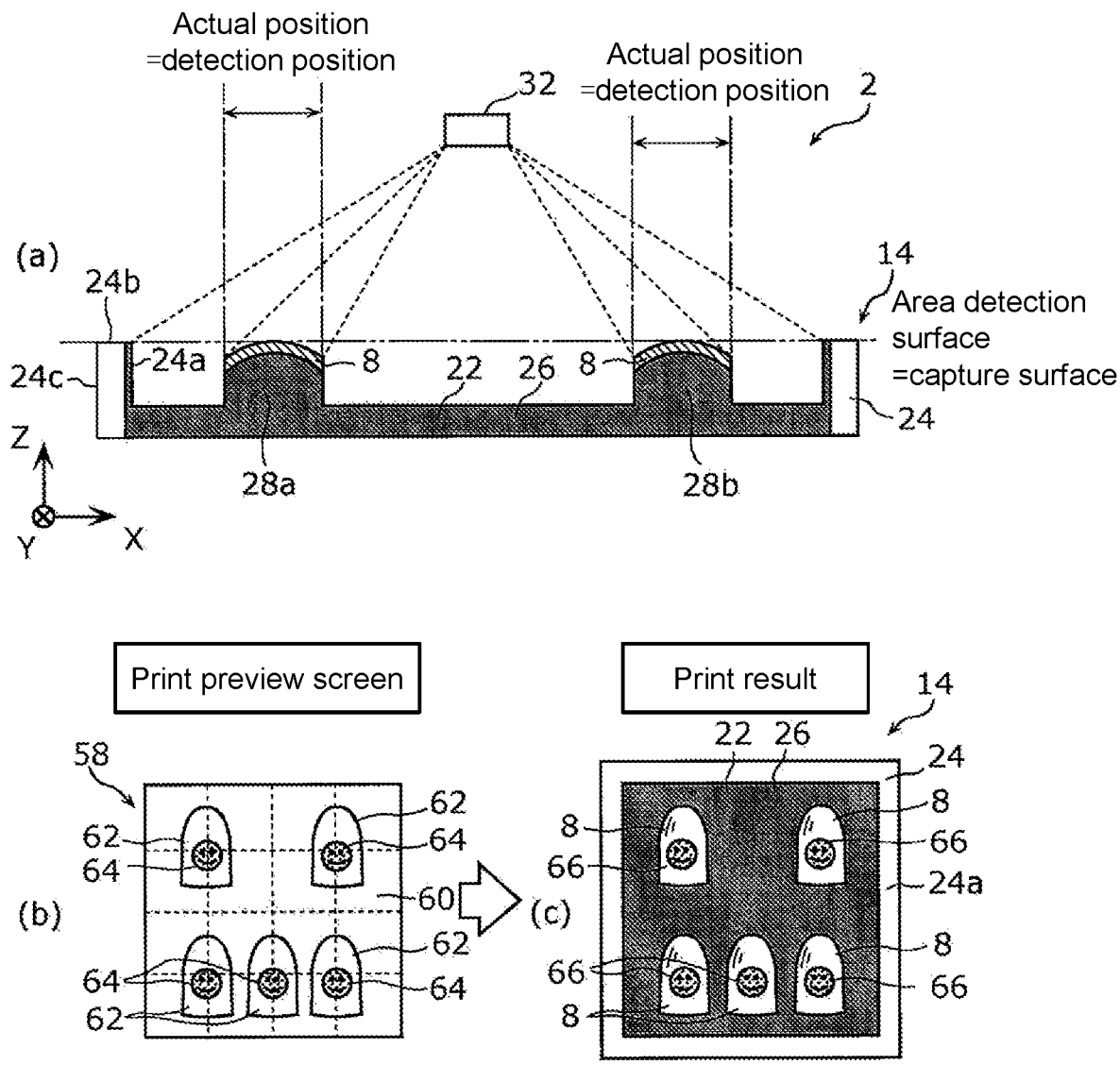
FIG. 13 is a diagram for explaining printing in the printing system according to the first embodiment.

Here, other effects obtained by the printing system 2 according to the first embodiment will be described with reference to FIGS. 12 and 13 while comparing with a printing system 100 according to a comparative example. FIG. 12 is a diagram for explaining printing in the printing system 100 according to the comparative example. FIG. 13 is a diagram for explaining printing in the printing system 2 according to the first embodiment. Also, in FIG. 12, the same components as those of the first embodiment are denoted by the same reference numerals, and descriptions thereof will be omitted.

As shown in (a) of FIG. 12, in the printing system 100 according to the comparative example, the tray 102 has only the placing member 22 and does not have the frame member. For that reason, in the case in which the imaging part 32 captures an image including the placing member 22 and the nail tips 8 placed on the placing member 22, the generation part 38 recognizes the upper surface of the base 26 as a surface detected as the printable region (hereinafter, referred to as a "capture surface") based on a position of the outer peripheral part of the base 26 of the placing member 22 included in the image. At this time, a height position of a surface defined by an upper end of the nail tip 8 placed on the placing member 22 (hereinafter referred to as an "area detection surface") shifts upward (to the plus side of the Z axis) with respect to a height position of the capture surface. As a result, a horizontal position (a position in the XY plane) of the nail tip 8 included in the image detected by the generation part 38 becomes a position displaced from an actual horizontal position of the nail tip 8.

For that reason, even in the case in which the design image 64 is disposed in a central part of the nail tip image 62 on the print preview screen 58 as shown in (b) of FIG. 12, the design 66 is printed at a position displaced from a central part of the nail tip 8 in an actual print result as shown in (c) of FIG. 12.

On the other hand, as shown in (a) of FIG. 13, in the printing system 2 according to the first embodiment, the tray 14 has the frame member 24 in addition to the placing member 22. Here, the inner peripheral surface of the frame member 24 is formed in black, like the placing member 22. For that reason, in the case in which the imaging part 32 captures an image including the nail tips 8 and the frame member 24 disposed to surround the nail tips 8, the generation part 38 recognizes the surface defined by the end surface 24b of the frame member 24 as the capture surface based on the position of the upper end of the inner peripheral surface of the frame member 24 included in the image. At this time, the height position of the area detection surface is the same as the height position of the capture surface. As a result, the horizontal position of the nail tip 8 included in the image detected by the generation part 38 is the same as the actual horizontal position of the nail tip 8.

For that reason, in the case in which the design image 64 is disposed in the central part of the nail tip image 62 on the print preview screen 58 as shown in (b) of FIG. 13, the pattern 66 is printed on the central part of the nail tip 8 even in the actual print result as shown in (c) of FIG. 13. Therefore, the design 66 can be accurately printed on the nail tip 8.

Also, even with the configuration shown in FIG. 12, instead of the configuration shown in FIG. 13, by storing information indicating the height position of the upper end of the nail tip 8 from the upper surface of the base 26 in a storage part in advance, the generation part 38 may correct the height position of the capture surface to the height position of the area detection surface based on the information.

Second Embodiment

Figure 14:
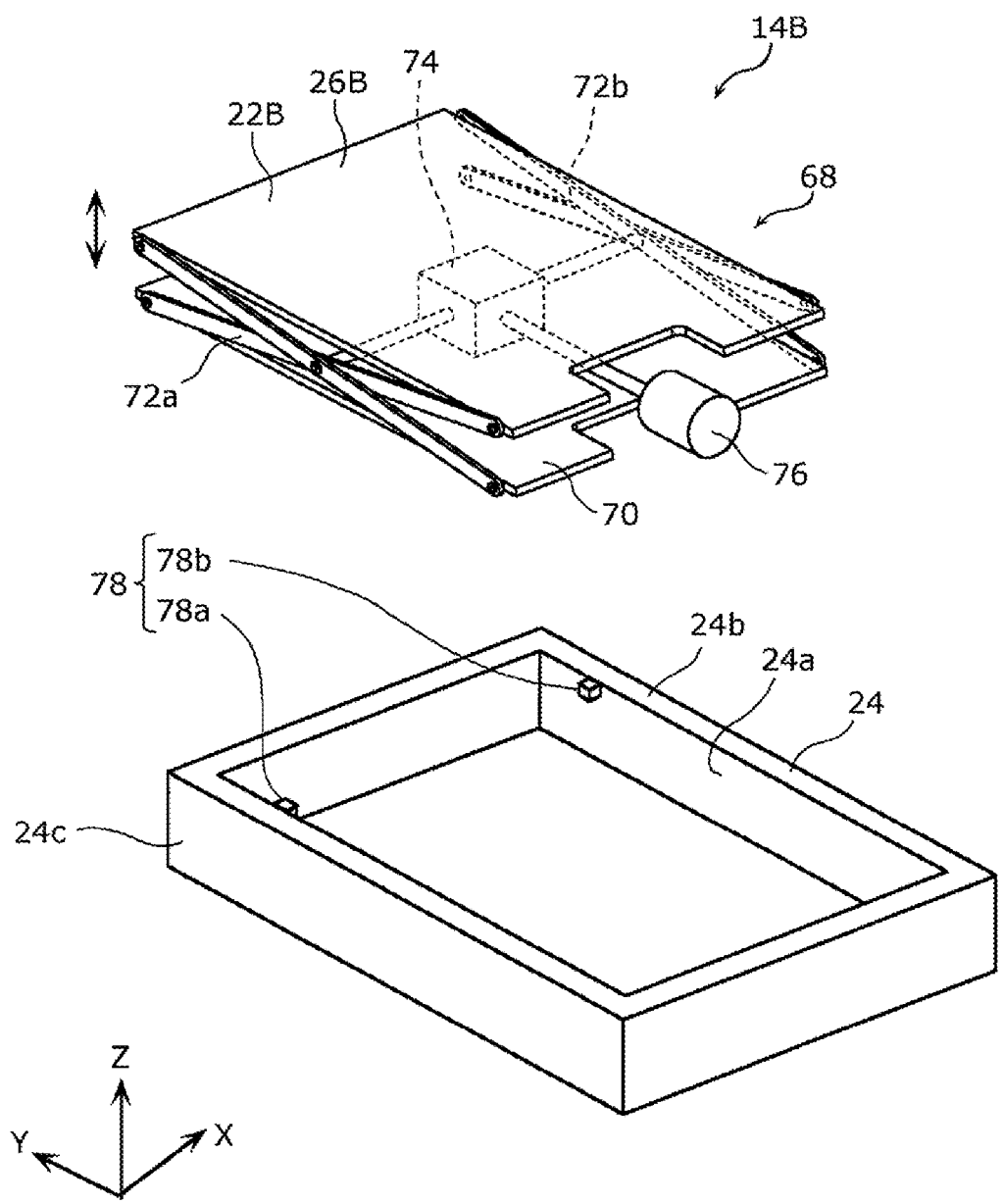
FIG. 14 is an exploded perspective view showing a tray according to a second embodiment.
Figure 15:
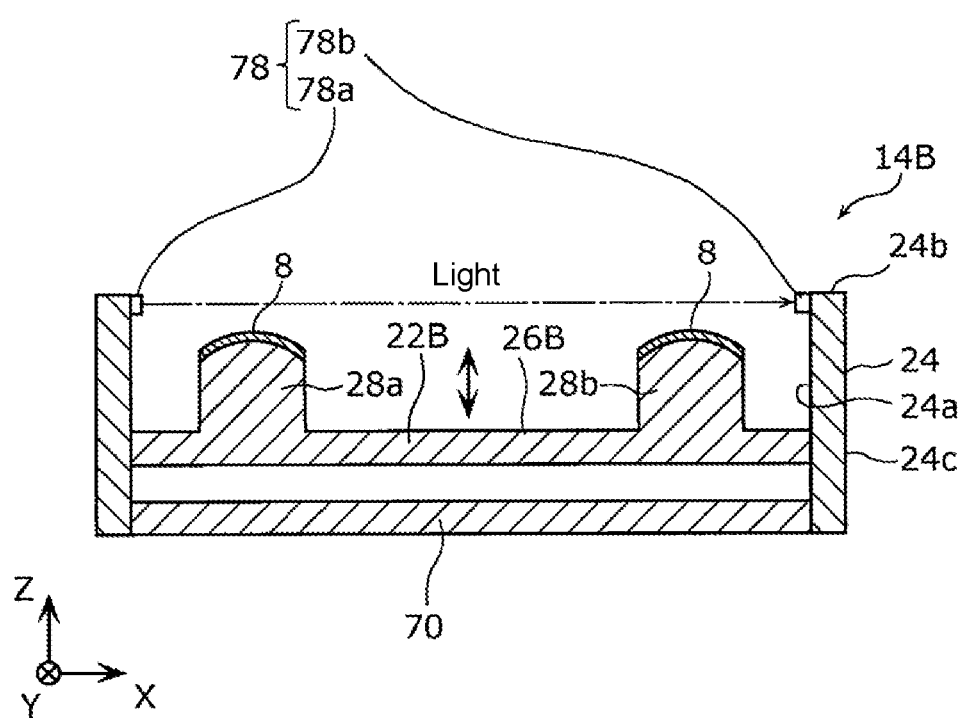
FIG. 15 is a cross-sectional view of the tray according to the second embodiment.

A structure of a tray 14B according to a second embodiment will be described with reference to FIGS. 14 and 15. FIG. 14 is an exploded perspective view showing the tray 14B according to the second embodiment. FIG. 15 is a cross-sectional view of the tray 14B according to the second embodiment. Also, in each of the following embodiments, the same components as those in the first embodiment are denoted by the same reference numerals, and descriptions thereof will be omitted.

As shown in FIG. 14, the tray 14B according to the second embodiment has a lifting mechanism 68 for moving a placing member 22B up and down in the vertical direction (Z axis direction) with respect to the frame member 24. Also, for the convenience of explanation, in FIG. 14, illustration of the plurality of placing tables 28a to 28e of the placing member 22B is omitted, and in FIG. 15, illustration of the lifting mechanism 68 (excluding a base part 70) is omitted.

As shown in FIG. 14, the lifting mechanism 68 has the base part 70, a pair of link mechanisms 72a and 72b, a drive mechanism 74, a drive source 76, and an upper limit sensor 78.

The base part 70 is formed in a substantially rectangular plate shape in an XY plan view and is disposed to face a lower surface of a base 26B of the placing member 22B. The base part 70 is fixed to a lower end part of the inner peripheral surface 24a of the frame member 24.

The pair of link mechanisms 72a and 72b are pantograph-like mechanisms that connect the base part 70 to the base 26B and are disposed to face each other.

The drive mechanism 74 moves the base 26B up and down with respect to the base part 70 by extending and contracting the pair of link mechanisms 72a and 72b. The drive source 76 is a motor for driving the drive mechanism 74.

The upper limit sensor 78 is configured of, for example, a transmissive photo sensor and has a light emitting element 78a and a light receiving element 78b. The light emitting element 78a and the light receiving element 78b are disposed to face each other at an upper end part of the inner peripheral surface 24a of the frame member 24.

As shown in FIG. 15, while light from the light emitting element 78a is received by the light receiving element 78b without being blocked by the nail tips 8 with the nail tips 8 placed on each of the placing tables 28a and 28b, the print control part 44 (see FIG. 5) drives the drive source 76 based on a detection signal from the upper limit sensor 78. Thus, the drive mechanism 74 moves the base 26B up with respect to the base part 70.

At a timing when the light from the light emitting element 78a is blocked by the nail tip 8 and is not received by the light receiving element 78b, the print control part 44 stops driving the drive source 76 based on the detection signal from the upper limit sensor 78. Thus, the drive mechanism 74 stops lifting of the base 26B at a timing when a height position of the upper end of the nail tip 8 becomes the same height position as the height position of the end surface 24b of the frame member 24.

Therefore, in the present embodiment, even in the case in which the nail tips 8 having various sizes (thicknesses) are placed on the placing member 22B, the lifting mechanism 68 can position the height position of the upper end of the nail tip 8 at the same height position as the height position of the end surface 24b of the frame member 24.

Also, although the drive mechanism 76 is driven by the drive source 76 in the present embodiment, it is not limited thereto, and the drive mechanism 74 may be manually driven by the user. Alternatively, the drive source 76 may be omitted, and a plate-shaped spacer may be inserted between the base 26B of the placing member 22B and the base part 70, thereby adjusting the height position of the upper end of the nail tip 8.

Third Embodiment

Figure 16:
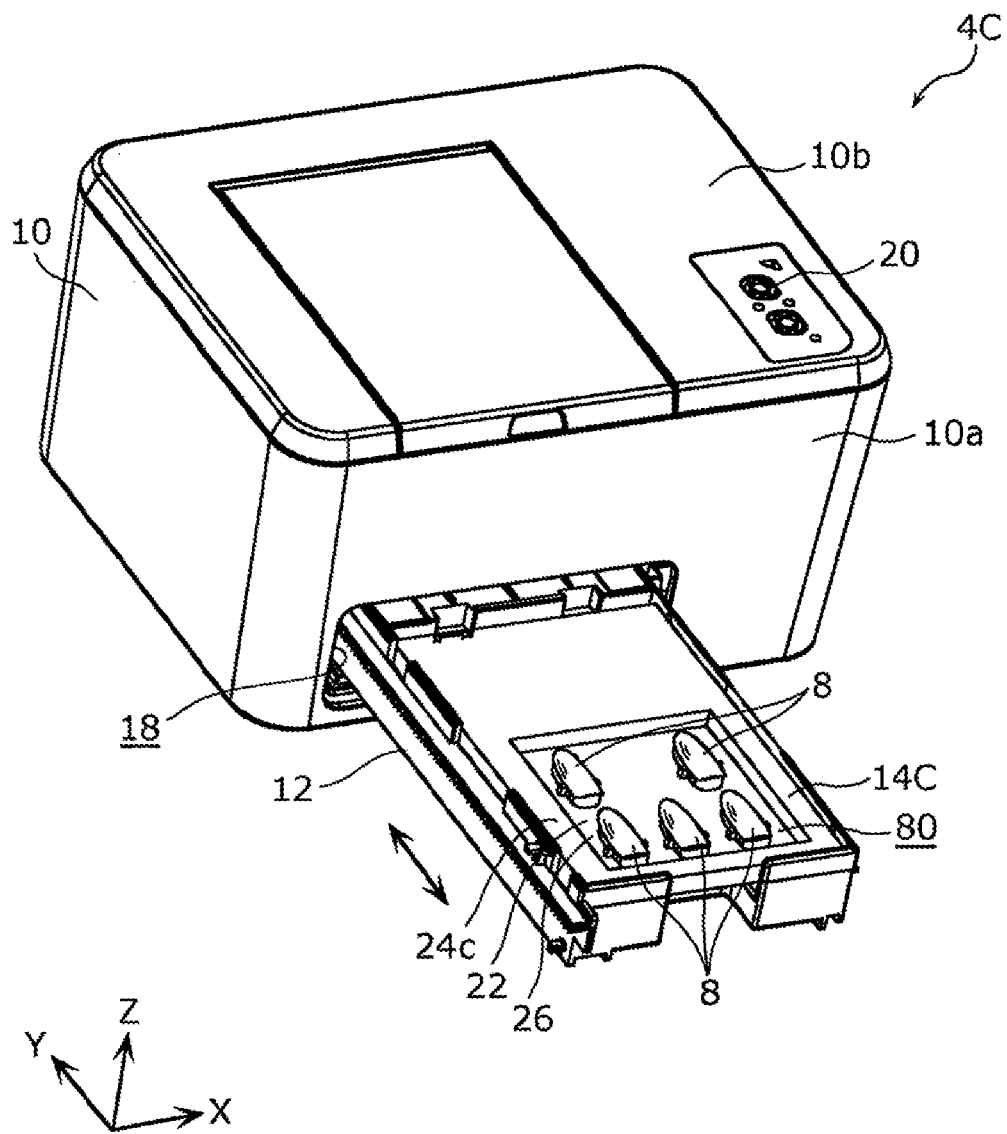
FIG. 16 is a perspective view showing a printing device according to a third embodiment.

A structure of a printing device 4C according to a third embodiment will be described with reference to FIG. 16. FIG. 16 is a perspective view showing the printing device 4C according to the third embodiment.

As shown in FIG. 16, in the printing device 4C according to the third embodiment, a structure of a tray 14C is different from that of the first embodiment. Specifically, a frame member 24C of the tray 14C is formed in a rectangular plate shape in an XY plan view. A rectangular recessed part 80 is formed on an upper surface of the frame member 24C in an XY plan view. The base 26 of the placing member 22 is supported on a bottom part of the recessed part 80. An inner peripheral surface of the recessed part 80 is disposed along the outer peripheral part of the upper surface of the base 26 of the placing member 22. That is, the inner peripheral surface of the recessed part 80 is disposed to rise from the outer peripheral part of the upper surface of the base 26 of the placing member 22 and is disposed to surround one or a plurality of nail tips 8 placed on the placing member 22.

Therefore, also in the present embodiment, the same effects as those in the first embodiment can be obtained.

Fourth Embodiment

Figure 17A:
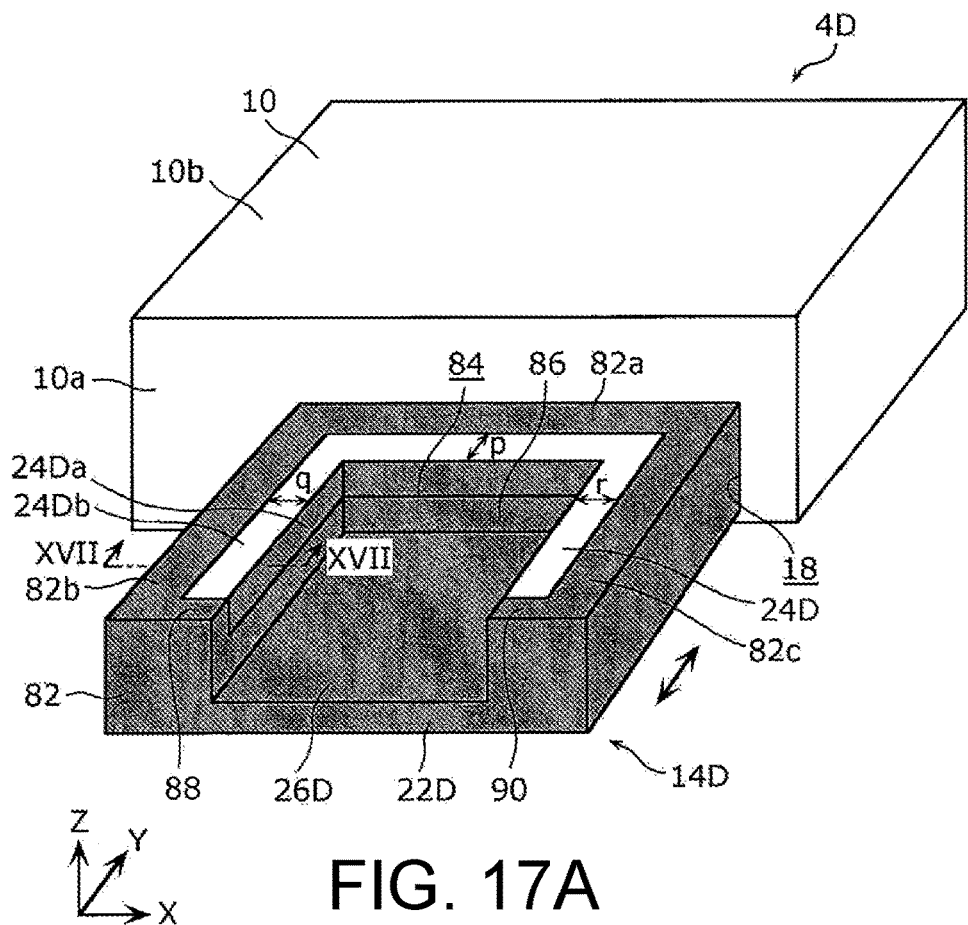
FIG. 17A is a perspective view schematically showing a printing device according to a fourth embodiment.
Figure 17B:
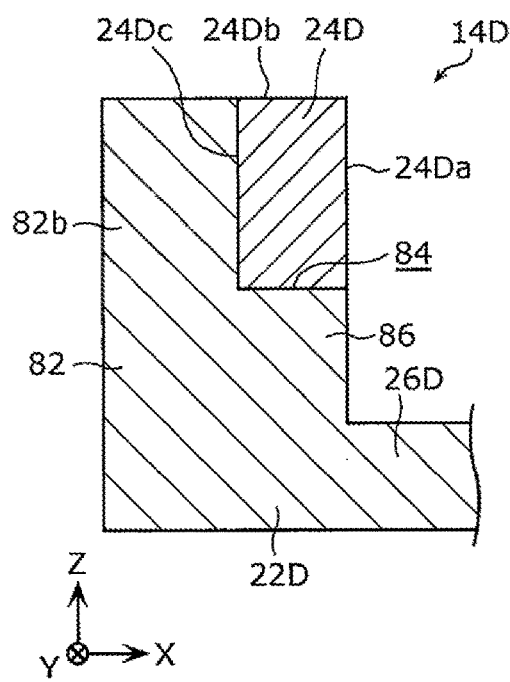
FIG. 17B is a cross-sectional view of a main part of a tray according to the fourth embodiment along line XVII-XVII in FIG. 17A.

A structure of a printing device 4D according to a fourth embodiment will be described with reference to FIGS. 17A and 17B. FIG. 17A is a perspective view schematically showing the printing device 4D according to the fourth embodiment. FIG. 17B is a cross-sectional view of a main part of a tray 14D according to the fourth embodiment along line XVII-XVII in FIG. 17A.

As shown in FIG. 17A, in the printing device 4D according to the fourth embodiment, a structure of the tray 14D is different from that of the first embodiment. Specifically, the tray 14D has a placing member 22D and a frame member 24D.

As shown in FIG. 17A, the placing member 22D also has a function as the cassette 12 described in the first embodiment. That is, the placing member 22D is slidable between the received position and the pulled-out position.

The placing member 22D includes a base 26D, a wall part 82, and a placing part 86. The wall part 82 is formed in a substantially U shape in an XY plan view and is disposed to rise from an outer peripheral part of the base 26D. A front side of the wall part 82 (the minus side of the Y axis) is open. The wall part 82 has a side wall part 82a extending in the left to right direction (X axis direction), and a pair of side wall parts 82b and 82c extending in parallel with each other from both end parts of the side wall part 82a in a longitudinal direction thereof toward the front side (the minus side of the Y axis).

As shown in FIGS. 17A and 17B, a U-shaped recessed part 84 in an XY plan view is formed in each inner peripheral part of the side wall parts 82a, 82b, and 82c. A placing part 86 is formed on each inner peripheral part of the side wall parts 82a, 82b, and 82c by the recessed part 84. Further, abutting parts 88 and 90 are respectively formed at end parts of the pair of side wall part 82b and 82c on the front side by the recessed part 84. The placing member 22D is formed, for example, in black. Also, for the convenience of explanation, in FIG. 17A, expression of the black color of the placing member 22D is replaced with a gray color.

As shown in FIG. 17A, the frame member 24D is formed in a U shape in an XY plan view and is detachably supported by the placing member 22D. The front side (minus side of the Y axis) of the frame member 24D is open. Also, widths p, q, and r of the frame member 24D may be the same or different from each other.

The frame member 24D is supported by the placing part 86 of the placing member 22D. At this time, an outer peripheral surface 24Dc (see FIG. 17B) of the frame member 24D is covered with the side wall parts 82a, 82b, and 82c. Also, both end parts of the frame member 24D on the open side are covered with the abutting parts 88 and 90 of the placing member 22D, respectively. Thus, an outer peripheral part of an end surface 24Db of the frame member 24D is covered with the side wall parts 82a, 82b, and 82c (including the abutting parts 88 and 90) in an XY plan view. Further, a height position of the end surface 24Db of the frame member 24D is the same as a height position of each upper surface of the side wall parts 82a, 82b, and 82c of the placing member 22D.

As shown in FIG. 17B, an inner peripheral surface 24Da of the frame member 24D is exposed to the outside. In addition, as shown in FIG. 17A, the inner peripheral surface 24Da of the frame member 24D is configured to have the same color as that of the placing member 22D, that is, in black. Further, the end surface 24Db of the frame member 24D is configured to have a color different from the color of the placing member 22D, for example, in white. At this time, although not shown in FIG. 17A, a U-shaped region having a predetermined width (for example, a width of about 3 mm) from an edge of the end surface 24Db of the frame member 24D on the inner peripheral surface 24Da side is formed in black. Also, for the convenience of explanation, in FIG. 17A, expression of the black color of the inner peripheral surface 24Da of the frame member 24D is replaced with a gray color.

Figure 17C:
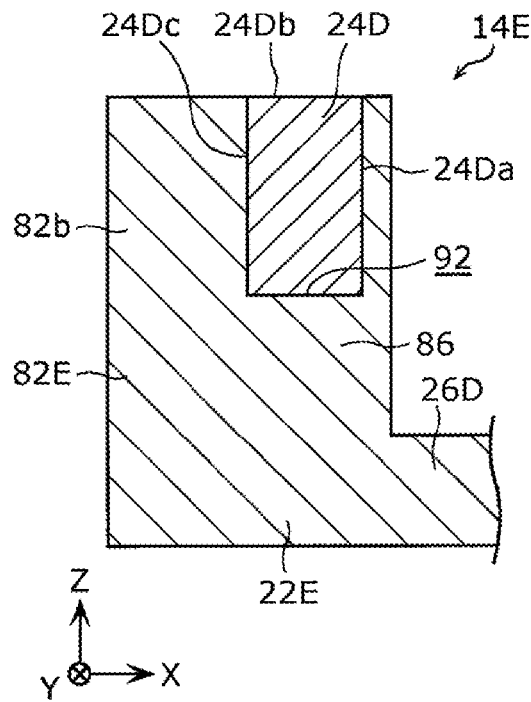
FIG. 17C is cross-sectional view of a main part of a tray according to a modified example of the fourth embodiment.

Although the inner peripheral surface 24Da of the frame member 24D is exposed to the outside in the present embodiment, it is not limited thereto and may be configured as follows, for example. FIG. 17C is a cross-sectional view of a main part of a tray 14E according to a modified example of the fourth embodiment. In the tray 14E shown in FIG. 17C, a U-shaped groove part 92 in an XY plan view is formed on each upper surface of the side wall parts 82a, 82b, and 82c of a wall part 82E of a placing member 22E. The frame member 24D is fitted in the groove part 92. Thus, the inner peripheral surface 24Da of the frame member 24D is covered by an inner peripheral surface of the groove part 92.

Figure 18:
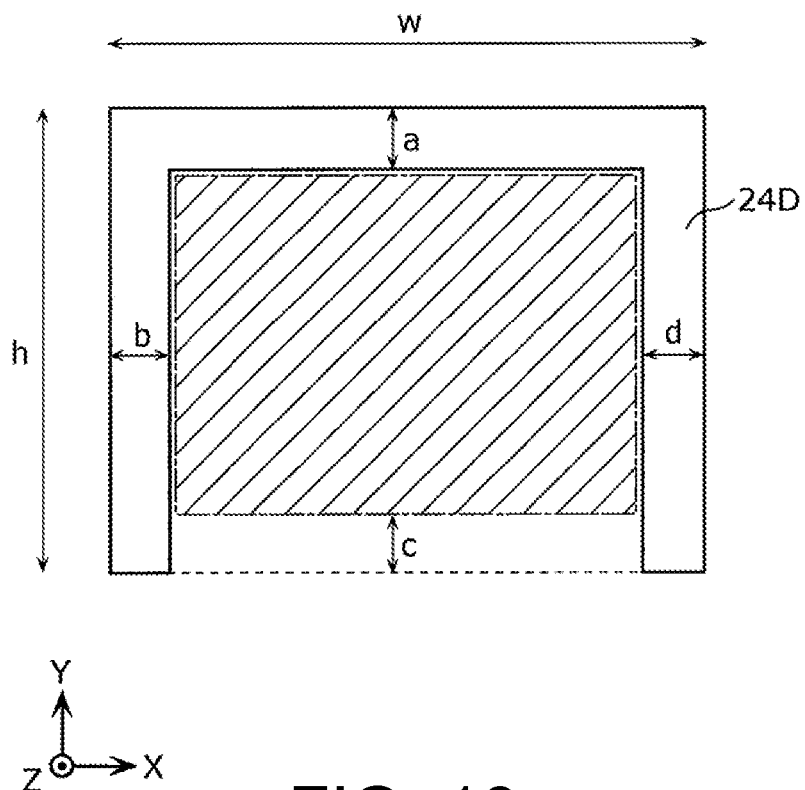
FIG. 18 is a diagram for explaining a method of calculating a printable region according to the fourth embodiment.

Here, a method of calculating the printable region according to the present embodiment will be described with reference to FIG. 18. FIG. 18 is a diagram for explaining the method of calculating the printable region according to the fourth embodiment.

As shown in FIG. 18, first, the display control part 36 (see FIG. 5) of the terminal device 6 recognizes all white regions (including the U-shaped region of the end surface 24Db of the frame member 24D) by binarizing the captured image.

Next, the display control part 36 performs Convex Hull processing (an example of predetermined image processing) on all the white regions recognized as described above, thereby converting all the white regions into a predetermined region. At this time, the U-shaped region of the end surface 24Db of the frame member 24D is converted into a rectangular region by complementing one open side of the U-shaped region.

Next, the display control part 36 narrows down only the region that satisfies all of the following three conditions, that is, a) 50% or more of a total area of the captured image is occupied, b) the number of vertices is 4, and c) the aspect ratio is close to the frame member 24D, from the regions converted as described above. Further, in the case in which the printable region from the captured image is cut off, recognition quality is reduced, and it is not suitable as the captured image, and thus, in order to recognize the capture operation as an error, it may narrow down only the region on the condition of d) not being adjacent to four sides around the captured image itself. As a result, the display control part 36 recognizes the U-shaped frame member 24D as a square frame member.

Next, the display control part 36 perspective-transforms the region narrowed down as described above into a size (w×h) of the frame member 24D.

Finally, the display control part 36 determines, as the printable region (the hatched region in FIG. 18), a range excluding the regions a, b, c, and d of the frame member 24D from the perspective-transformed image.

Hereinafter, effects obtained by the printing device 4D of the present embodiment will be described.

As described above, the front side of the frame member 24D is open. Thus, the user can place a print target (an example of the recording medium) such as the nail tip 8 on the placing member 22D through the front side of the frame member 24D. In addition, when the placing member 22D is slid from the received position to the pulled-out position after printing is completed, the frame member 24D is removed from the placing member 22D, so that the print target can be easily taken out from the placing member 22D. Further, in the case in which the image including the frame member 24D and the placing member 22D is captured by the imaging part 32 (see FIG. 5) of the terminal device 6, the display control part 36 can easily determine the orientations of the frame member 24D and the placing member 22D.

Also, as described above, the U-shaped region having a predetermined width (for example, a width of about 3 mm) from the edge of the end surface 24Db of the frame member 24D on the inner peripheral surface 24Da side is formed in black. Thus, it is possible to increase printing accuracy, and, even in the case in which the print target placed on the placing member 22D comes into contact with the inner peripheral surface 24Da of the frame member 24D, the print target can be accurately recognized.

Also, as described above, the height position of the end surface 24Db of the frame member 24D is the same as the height position of each upper surface of the side wall parts 82a, 82b, and 82c of the placing member 22D. Thus, the height position of the area detection surface can be set to the same height position as the height position of the capture surface, similar to that described in the first embodiment. As a result, printing accuracy can be improved.

Figure 19:
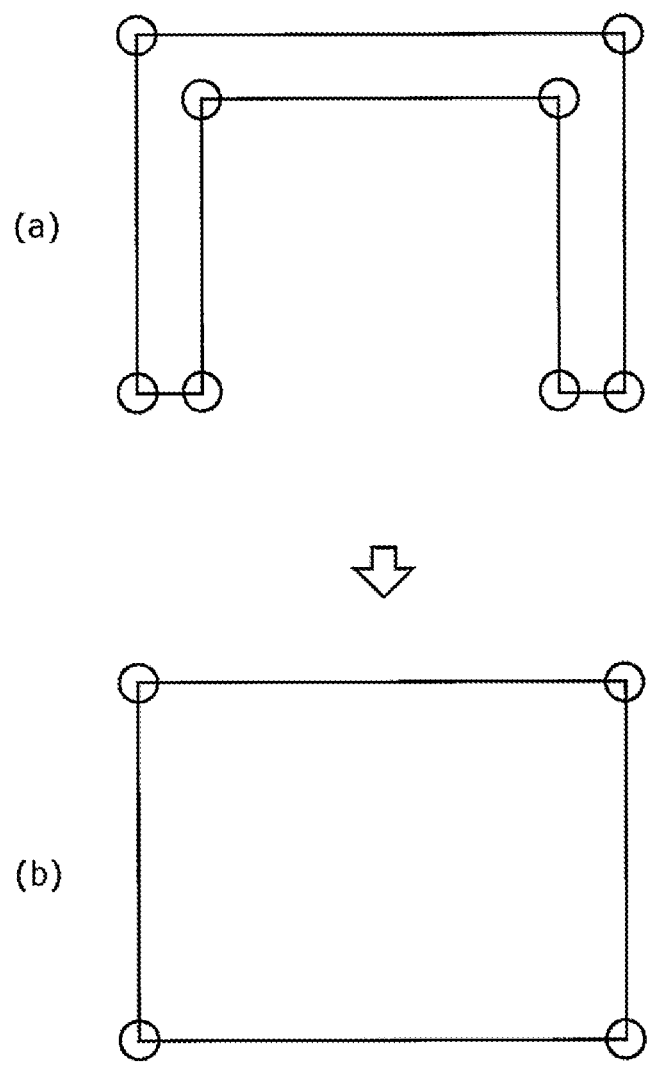
FIG. 19 is a diagram for explaining another method of calculating the printable region.

Also, instead of the above-described method of calculating the printable region, for example, the following method of calculating the printable region may be adopted. FIG. 19 is a diagram for explaining another method of calculating the printable region.

First, the display control part 36 of the terminal device 6 recognizes all white regions (including the U-shaped region of the end surface 24Db of the frame member 24D) by binarizing the captured image.

Next, as shown in (a) of FIG. 19, among all the white regions recognized as described above, the display control part 36 narrows down the U-shaped region of the end surface 24Db of the frame member 24D as a region having eight vertices.

Next, as shown in (b) of FIG. 19, the display control part 36 leaves four outer vertices out of the above-described eight vertices and complements the one open side of the U-shaped region to convert the region into a rectangular region. Thus, the display control part 36 recognizes the U-shaped frame member 24D as a square frame member.

Next, the display control part 36 narrows down the rectangular region converted as described above in the case in which the rectangular region satisfies all of the following three conditions, that is, a) 50% or more of a total area of the captured image is occupied, b) the number of vertices is 4, and c) the aspect ratio is close to the frame member 24D. Further, in the case in which the printable region from the captured image is cut off, recognition quality is reduced, and it is not suitable as the captured image, and thus, in order to recognize the capture operation as an error, it may narrow down only the region on the condition of d) not being adjacent to four sides around the captured image itself.

Next, the display control part 36 perspective-transforms the rectangular region narrowed down as described above into a size (w×h) of the frame member 24D.

Finally, the display control part 36 determines, as the printable region, a range excluding the regions a, b, c, and d (see FIG. 18) of the frame member 24D from the perspective-transformed image.

MODIFIED EXAMPLE

Although the printing device and the like according to the first to fourth embodiments of the present invention have been described above, the disclosure is not limited to the embodiments described above. For example, the above embodiments may be combined with each other.

Although the printing method of the printing unit 16 is the ink jet method in each of the above embodiments, the printing method is not limited thereto, and other printing methods may be adopted.

Although the placing member 22 (22B, 22D, and 22E) and the inner peripheral surface 24a (24Da) of the frame member 24 (24C and 24D) are each formed in black and the end surface 24b (24Db) and the outer peripheral surface 24c of the frame member 24 (24C and 24D) are formed in white in each of the above embodiments, the disclosure is not limited thereto, and for example, they may be configured to have different colors which are in a complementary color relationship, or may be configured to have colors in the range having different component values when color components used for discrimination are extracted.

Although the information processing device is configured by the terminal device 6 in each of the above-described embodiments, the disclosure is not limited thereto, and the information processing device may be configured by a server, for example. In this case, for example, by transmitting an image captured by an imaging part of a mobile terminal to the server, the server generates the print information based on the received image.

Although the nail tip 8 is adopted as the recording medium to be printed by the printing device 4 (4C and 4D) in each of the above-described embodiments, the disclosure is not limited thereto, and for example, an arbitrary three-dimensional object such as a smartphone case and a golf ball may be adopted as the recording medium.

Although the imaging part 32 of the terminal device 6 is configured to capture the image in each of the above embodiments, the disclosure is not limited thereto, and the image may be captured by an imaging part disposed inside the housing 10 of the printing device 4 (4C and 4D). In this case, the tray 14 (14B, 14C, 14D, and 14E) may be omitted, and a member corresponding to the frame member 24 (24C and 24D) may be disposed inside the housing 10 of the printing device 4 (4C and 4D).

Although the terminal device 6 is configured to have the display control part 36 and the generation part 38 in each of the above embodiments, the disclosure is not limited thereto, and the printing device 4 (4C and 4D) may be configured to perform the processes of the display control part 36 and the generation part 38. Alternatively, the printing device 4 (4C and 4D) and the terminal device 6 may be configured to perform the processes of the display control part 36 and the generation part 38 together.

The disclosure can be applied as a printing device or the like for printing nail tips, for example.

Other Configuration

According to one embodiment of the disclosure, the disclosure provides a printing device for performing printing on a recording medium and includes: a frame member disposed to surround the recording medium; a printing part that performs printing on the recording medium surrounded by the frame member; an acquisition part that acquires print information which is generated based on an image obtained by capturing the frame member and the recording medium and indicates a layout of printing to be applied to the recording medium in a printable region defined by the frame member; and a print control part that controls the print part based on the acquired print information.

According to the above printing device, since the print control part controls the print part based on the print information indicating the layout of printing to be applied to the recording medium in the printable region defined by the frame member, the print control part can recognize the layout of printing to be applied to the recording medium based on the print information, for example, even in the case in which a user places the recording medium at an arbitrary position. As a result, printing on the recording medium can be performed with high accuracy.

For example, in one embodiment of the disclosure, the printing device may further include a placing member having a placing surface on which the recording medium is placed, the frame member may be disposed along an outer peripheral part of the placing surface of the placing member, and the placing surface of the placing member and an end surface of the frame member may have different colors in a plan view.

According to the above printing device, since the placing surface of the placing member and the end surface of the frame member have different colors in a plan view, the printable region defined by the frame member can be accurately recognized based on the contrast between the placing surface of the placing member and the end surface of the frame member in an image obtained by capturing the frame member and the recording medium.

For example, in one embodiment of the disclosure, the disclosure may be configured such that the frame member is disposed to rise from the outer peripheral part of the placing surface of the placing member, and an inner peripheral surface of the frame member may have the same color as the placing surface of the placing member.

According to the above printing device, a height position of a surface detected as the printable region (a surface defined by the end surface of the frame member) and a height position of a surface defined by the recording medium placed on the placing member can be matched with each other. As a result, print deviation on the recording medium can be inhibited.

For example, in one embodiment of the disclosure, the printing device may further include a lifting mechanism for elevating the placing member with respect to the frame member.

According to the above printing device, the placing member is moved up and down with respect to the frame member by the lifting mechanism in accordance with a size of the recording medium, or the like, so that a height position of the recording medium placed on the placing member can be positioned at a height position of the end surface of the frame member. As a result, the height position of the surface detected as the printable region (the surface defined by the end surface of the frame member) and the height position of the surface defined by the recording medium placed on the placing member can be easily matched with each other.

For example, in one embodiment of the disclosure, the printing device may be configured such that the placing surface of the placing member is formed in black, and the end surface of the frame member is formed in white.

According to the above printing device, the contrast between the placing surface of the placing member and the end surface of the frame member in the image obtained by capturing the frame member and the recording medium can be made clearer.

According to another embodiment of the disclosure, the disclosure provides an information processing device which can communicate with a printing device for performing printing on a recording medium, and includes: an imaging part that captures an image including the recording medium and a frame member disposed to surround the recording medium; a generation part that generates print information indicating a layout of printing to be applied to the recording medium in a printable region defined by the frame member based on the image captured by the imaging part; and a transmission part that transmits the generated print information to the printing device.

According to the above information processing device, since the transmission part transmits the print information indicating the layout of printing to be applied to the recording medium in the printable region defined by the frame member to the printing device, the printing device can recognize the layout of printing to be applied to the recording medium based on the print information from the information processing device, for example, even in the case in which a user places the recording medium at an arbitrary position in the printing device. As a result, printing on the recording medium can be performed with high accuracy in the printing device.

For example, in one embodiment of the disclosure, the information processing device may further include a display part, and a display control part that displays the image captured by the imaging part on the display part, the generation part may further generate layout information indicating a layout of the recording medium in the printable region based on the image captured by the imaging part, and the display control part may cause the display part to display a layout image indicating the layout of the recording medium in the printable region based on the layout information when the layout information is generated by the generation part.

According to the above information processing device, since the display control part causes the display part to display the layout image indicating the layout of the recording medium in the printable region, the user can use the layout image displayed on the display part as a print preview screen.

For example, in one embodiment of the disclosure, the information processing device may be configured such that the display control part further displays, in the layout image, a design image showing a design to be printed on the recording medium by superimposing the design image on a recording medium image showing the recording medium, and the generation part generates the print information based on the design image superimposed on the recording medium image.

According to the above information processing device, since the display control part superimposes and displays the design image on the recording medium image in the layout image, the user can easily recognize a print image of the recording medium on which the design has been printed.

For example, in one embodiment of the disclosure, the information processing device may be configured such that the display control part further synthesizes pixels in the layout image using a subtractive color method in the design image superimposed on the recording medium image.

According to the above information processing device, when the user views the layout image displayed on the display part as the print preview screen, by making a color of the design image in the layout image the same as a color of the design actually printed on the recording medium, it is possible to prevent the user from feeling uneasy.

For example, in one embodiment of the disclosure, the information processing device may be configured such that the display control part further performs a masking process of masking a region of the design image projecting outside the recording medium image when the design image is displayed to be superimposed on the recording medium image in the layout image.

According to the above information processing device, by masking the region of the design image projecting outside the recording medium image through the masking process, wasteful printing is not performed in the projecting region so that wasteful consumption of ink or the like can be inhibited, and it is possible to prevent components (for example, a tray and the like) of the printing device from being unnecessarily soiled with ink.

For example, in one embodiment of the disclosure, the information processing device may be configured such that the display control part further causes a notification display to be superimposed and displayed on the frame member included in the image and changes a color of the notification display in accordance with an imaging angle of the imaging part when the image captured by the imaging part is being displayed on the display part.

According to the above information processing device, by changing the color of the notification display in accordance with the imaging angle of the imaging part, the user can be urged to adjust the imaging angle of the imaging part to an appropriate imaging angle.

For example, in one embodiment of the disclosure, the information processing device may be configured such that the frame member is formed in a U shape, and the display control part further performs predetermined image processing on an image obtained by capturing the U-shaped frame member to complement the frame member so that the frame member is recognized as a rectangular shape.

According to the above information processing device, since the frame member is formed in a U shape, the recording medium can be easily taken out. Further, since the display control part performs the predetermined image processing on the image obtained by capturing the U-shaped frame member to complement the frame member to be recognized as a square shape, the printable region can be easily determined.

According to the printing device and the like according to one aspect of the disclosure, it is possible to perform printing on the recording medium with high accuracy.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A printing device for performing printing on a plurality of individual recording media and communicating with a terminal device, comprising:
   a housing and a cassette, wherein the cassette is slidable between a received position at which the cassette is received inside the housing and a pulled-out position at which the cassette is pulled out toward a front side of the housing;
   a tray is for placing the plurality of individual recording media and is detachably supported on an upper surface of the cassette, wherein the tray includes a placing member and a frame member, the placing member has a base and a plurality of placing tables, wherein the plurality of individual recording media is respectively placed on the plurality of placing tables, and the frame member is disposed to rise from and surround entirely an outer peripheral part of an upper surface of the base of the placing member, so that the plurality of placing tables is surrounded by the frame member, and an end surface of the frame member is configured to protrude upward and perpendicular to the base;
   a printing part that performs the printing on the plurality of individual recording media surrounded by the frame member;
   an acquisition part that acquires print information from the terminal device, wherein the print information is generated by the terminal device based on an image obtained by capturing the frame member and the plurality of individual recording media and indicates a layout of the printing to be applied to the plurality of individual recording media in a printable region defined by the frame member; and
   a print control part that controls the print part based on the acquired print information.

2. The printing device according to claim 1, further comprising a placing member having a placing surface on which the plurality of individual recording media is placed,
   wherein the frame member is disposed along an outer peripheral part of the placing surface of the placing member, and
   the placing surface of the placing member and an end surface of the frame member are configured to have different colors in a plan view.

3. The printing device according to claim 2,
   wherein the frame member is disposed to rise from the outer peripheral part of the placing surface of the placing member, and
   an inner peripheral surface of the frame member is configured to have the same color as the placing surface of the placing member.

4. The printing device according to claim 3, further comprising a lifting mechanism for moving the placing member up and down with respect to the frame member.

5. The printing device according to claim 2,
wherein the placing surface of the placing member is formed in black, and
the end surface of the frame member is formed in white.

6. The printing device according to claim 1, wherein the plurality of individual recording media comprises a plurality of artificial nail tips.

7. A terminal device which can communicate with a printing device, wherein the printing device comprises a housing and a cassette, wherein the cassette is slidable between a received position at which the cassette is received inside the housing and a pulled-out position at which the cassette is pulled out toward a front side of the housing; and a tray that is for placing the plurality of individual recording media and is detachably supported on an upper surface of the cassette, wherein the tray includes a placing member and a frame member, the placing member has a base and a plurality of placing tables, wherein the plurality of individual recording media is respectively placed on the plurality of placing tables and the frame member is disposed to rise from and surround entirely an outer peripheral part of an upper surface of the base of the placing member, so that the plurality of placing tables is surrounded by the frame member, and an end surface of the frame member is configured to protrude upward and perpendicular to the base, wherein the printing device performs printing on the plurality of individual recording media, the terminal device comprising:
an imaging part that captures an image including the plurality of individual recording media and the frame member;
a generation part that generates print information indicating a layout of the printing to be applied to the plurality of individual recording media in a printable region defined by the frame member based on the image captured by the imaging part; and
a transmission part that transmits the generated print information to the printing device.

8. The terminal device according to claim 7, further comprising:
a display part; and
a display control part that displays the image captured by the imaging part on the display part,
wherein the generation part further generates layout information indicating a layout of the plurality of individual recording media in the printable region based on the image captured by the imaging part, and
the display control part causes the display part to display a layout image indicating the layout of the plurality of individual recording media in the printable region based on the layout information when the layout information is generated by the generation part.

9. The terminal device according to claim 8,
wherein the display control part further displays, in the layout image, a design image showing a design to be printed on the plurality of individual recording media by superimposing the design image on a recording medium image showing the plurality of individual recording media, and
the generation part generates the print information based on the design image superimposed on the recording medium image.

10. The terminal device according to claim 9, wherein the display control part further synthesizes pixels in the layout image using a subtractive color method in the design image superimposed on the recording medium image.

11. The terminal device according to claim 10, wherein the display control part further performs a masking process of masking a region of the design image projecting outside the recording medium image when the design image is displayed to be superimposed on the recording medium image in the layout image.

12. The terminal device according to claim 9, wherein the display control part further performs a masking process of masking a region of the design image projecting outside the recording medium image when the design image is displayed to be superimposed on the recording medium image in the layout image.

13. The terminal device according to claim 9, wherein the display control part further causes a notification display to be superimposed and displayed on the frame member included in the image and changes a color of the notification display in accordance with an imaging angle of the imaging part when the image captured by the imaging part is being displayed on the display part.

14. The terminal device according to claim 9, wherein the frame member is formed in a U shape, and the display control part further performs predetermined image processing on an image obtained by capturing the U-shaped frame member to complement the frame member so that the frame member is recognized as a rectangular shape.

15. The terminal device according to claim 8, wherein the display control part further causes a notification display to be superimposed and displayed on the frame member included in the image and changes a color of the notification display in accordance with an imaging angle of the imaging part when the image captured by the imaging part is being displayed on the display part.

16. The terminal device according to claim 8, wherein the frame member is formed in a U shape, and the display control part further performs predetermined image processing on an image obtained by capturing the U-shaped frame member to complement the frame member so that the frame member is recognized as a rectangular shape.

* * * * *